(12) United States Patent
Sato et al.

(10) Patent No.: US 6,418,104 B1
(45) Date of Patent: Jul. 9, 2002

(54) TILT DETECTOR

(75) Inventors: Makoto Sato; Seiichi Ohsawa, both of Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/428,558

(22) Filed: Oct. 28, 1999

(30) Foreign Application Priority Data

Oct. 29, 1998 (JP) ............................................ 10-309193

(51) Int. Cl.$^7$ ................................................ G11B 3/90
(52) U.S. Cl. ................................. 369/53.19; 369/44.32
(58) Field of Search ......................... 369/44.26, 44.32, 369/44.35, 44.41, 47.15, 47.28, 47.36, 53.12, 53.14, 275.3, 53.19

(56) References Cited

U.S. PATENT DOCUMENTS 6,275,466 B1 * 8/2001 Nagasawa et al. ........ 369/275.3

* cited by examiner

Primary Examiner—Paul W. Huber
(74) Attorney, Agent, or Firm—Young & Thompson

(57) ABSTRACT

A tilt detector is adapted to be used for a storage medium provided with a recording track on which information is recorded and a first and a second header portions, each arranged in a manner shifted in opposite directions to each other from a center line of the recording track. The detector includes a light irradiation unit for irradiating a light beam onto the first header portion, the second header portion and the recording track; a light receiving unit having a first light receiving surface and a second light receiving surface arranged adjacently and for receiving the light beam reflected by the storage medium, the first light receiving surface outputting a first output and the second light receiving surface outputting a second output; an operation unit for executing an arithmetic operation of the first output and the second output to generate an operation result signal; and an error signal generation unit for generating a tilt error signal based on the operation result signal. The tilt error signal indicates a tilt between the storage medium and an optical axis of the light beam.

12 Claims, 33 Drawing Sheets

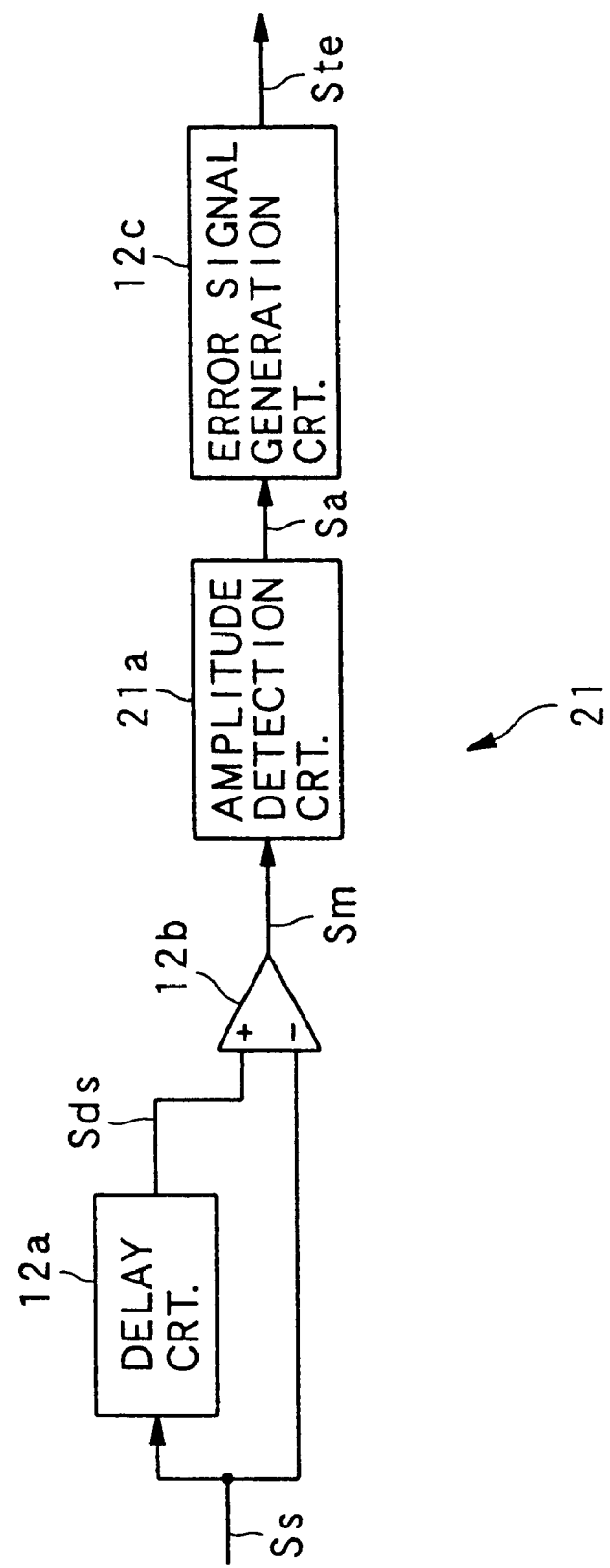

TILT DETECTOR

BACKGROUND OF THE INVENTION

1. Field of the Invention

The present invention relates to a tilt detector for detecting a tilt which occurs between an information recording surface of a storage medium and an optical axis of a light beam used for recording and/or reproduction, when information is optically recorded on the storage medium and/or information is optically reproduced from the storage medium.

2. Description of Related Art

Recently, there is broadly known a technique in which a light beam such as a laser beam and the like is applied to a disc-shaped storage medium to optically record information onto the storage medium and/or to optically reproduce information already recorded on the storage medium therefrom. At the time of recording and/or reproducing information on and/or from a disc-shaped storage medium using the light beam, the angle between the information recording surface of the storage medium and the optical axis of the light beam may sometimes shift from the right angle (i.e., 90 degrees) to induce a tilt in a radial direction of the storage medium (this tilt occurring in the radial direction of the disc-shaped storage medium will be hereinafter referred to as "radial tilt"). For example, a centrifugal force in the storage medium revolution and a deflection of the storage medium itself due to an aged change may be the causes of the radial tilt. If information is recorded or reproduced in the presence of the radial tilt, aberration (mainly coma-aberration) takes place within the light beam irradiated range on the information recording surface of the storage medium. This disables the precise control of light-spot size, and hence high-density information recording becomes difficult. Therefore, it is necessary to detect the quantity and the direction of the radial tilt and compensate for it. For example, in a most general radial tilt detection method employing a tilt sensor, a dedicated light beam for radial tilt detection is irradiated on the information recording surface, separately from the light beam used for information recording and/or reproduction. The light beam reflected by the surface is received by a light detector including multiple light detecting portions divided by a divisional line arranged in parallel with the circumferential direction of the storage medium, and the quantity and the direction of the radial tilt are obtained from the difference of the received light quantities of the respective light detecting portions. Namely, if the difference is equal to zero, there is occurring no radial tilt. If the difference is not zero, there is occurring a radial tilt in the light beam, which has the direction corresponding to the polarity of the difference and the quantity corresponding to the absolute value of the difference.

There is known a disc-shaped information storage medium so-called DVD-RAM (DVD-Random Access Memory) which was standardized recently and has an ability to record and/or reproduce information repeatedly for many times. The DVD-RAM is an improvement of DVD which has much larger recording capacity than CD and enables repetitive recording and reproduction for multiple times. In an apparatus for recording and/or reproducing information on and/or from DVD-RAM, no radial tilt detection and compensation function has been employed. This is mainly because DVD-RAM has the same size as CD, and large radial tilt which needs its compensation rarely took place. However, in order to further improve the accuracy of information recording/reproduction for the DVD-RAM, it is preferred to compensate for the radial tilt even if it is small.

Supposing that the conventional tilt sensor (i.e., the above-mentioned dedicated tilt sensor which additionally irradiates dedicated light beams for tilt detection) is used to detect the radial tilt taking place in relation to the DVD-RAM, the tilt sensor needs high-accuracy detection function due to the fact that the tilt itself is small, thereby increasing the cost of the information recording and/or reproducing apparatus. Further, additionally providing the dedicated tilt sensor increases the adjustment steps of the tilt sensor itself in the manufacturing process of the information recording and/or reproducing apparatus, thereby declining the productivity. Still further, the detection accuracy of the radial tilt may decline due to aging of the tilt sensor.

SUMMARY OF THE INVENTION

It is an object of the present invention to provide a tilt detector capable of accurately detecting the radial tilt without providing a dedicated tilt sensor.

According to one aspect of the present invention, there is provided a tilt detector adapted to be used for a storage medium provided with a recording track on which information is recorded and a first and a second header portions, each arranged in a manner shifted in opposite directions to each other from a center line of the recording track, the detector including: a light irradiation unit for irradiating a light beam onto the first header portion, the second header portion and the recording track; a light receiving unit having a first light receiving surface and a second light receiving surface arranged adjacently to each other on both sides of a divisional line which is in parallel with the direction of the center line and for receiving the light beam reflected by the storage medium, the first light receiving surface outputting a first output and the second light receiving surface outputting a second output; an operation unit for executing an arithmetic operation of the first output and the second output to generate an operation result signal; and an error signal generation unit for generating a tilt error signal eased on the operation result signal, the tilt error signal indicating a tilt between the storage medium and an optical axis of the light beam.

The above tilt detector receives the light beam reflected by the first header portion and the second header portion formed on the storage medium with the shifts in opposite directions to each other from the center line of the recording track, and detects the tilt between the storage medium and the optical axis of the light beam using the reflected light. Therefore, the tilt can be detected without providing a dedicated tilt sensor.

The error signal generation unit may include a low-pass filter which extracts a low-frequency component of the operation result signal as the tilt error signal. By this, the quantity and the direction of the tilt can be accurately detected with a simple configuration.

The error signal generation unit may include an averaging circuit which extracts a D.C. component of the operation result signal as the tilt error signal. Thus, the quantity and the direction of the tilt can be accurately detected.

In a preferred embodiment, the storage medium may include a disc-shaped storage medium, the recording track may include a pre-groove portion and a land portion, the first header portion may be arranged in a manner shifted by a half track pitch in a first radial direction of the disc-shaped recording medium from a center line of the pre-groove portion, and the second header portion may be arranged in a manner shifted by the half track pitch in a second radial direction, opposite to the first radial direction, of the disc-shaped recording medium from the center line of the pre-groove portion. With this arrangement, the tilt in the radial direction of the disc-shaped storage medium can be accurately detected without the use of a dedicated tilt sensor.

According to another aspect of the present invention, there is provided a tilt detector adapted to be used for a disc-shaped storage medium provided with a recording track on which information is recorded and header areas on which predetermined address information is recorded, the recording track including a pre-groove portion and a land portion, each of the header areas including a first header portion arranged in a manner shifted by a half track pitch in a first radial direction of the storage medium from a center line of the pre-groove portion and a second header portion arranged in a manner shifted by a half track pitch in a second radial direction, opposite to the first radial direction, of the storage medium from the center line of the pre-groove portion, the tilt detector including: an irradiation unit for irradiating a light beam onto the header areas and the recording track; a light receiving unit having a first light receiving surface and a second light receiving surface arranged adjacently to each other on both sides of a divisional line which is in parallel with the direction of the center line and for receiving the light beam reflected by the storage medium, the first light receiving surface outputting a first output and the second light receiving surface outputting a second output; a reproduction signal generation unit for generating a first reproduction signal corresponding to the address information recorded in the first header portion and a second reproduction signal corresponding to the address information recorded in the second header portion based on the first output and the second output; a delay unit for delaying the first reproduction signal by a predetermined time period to generate a delay signal; an operation unit for executing an arithmetic operation of the delay signal and the second reproduction signal to generate an operation result signal; and an error signal generation unit for generating a tilt error signal based on the operation result signal, the tilt error signal indicating a tilt between the storage medium and an optical axis of the light beam.

The above tilt detector receives the light beam reflected by the first header portion and the second header portion formed on the disc-shaped storage medium with the shifts in opposite directions to each other from the center line of the recording track, and detects the tilt between the storage medium and the optical axis of the light beam using the reflected light. Therefore, the tile can be detected without providing a dedicated tilt sensor.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 10 is a block diagram showing the configuration of the servo signal generation circuit of the third embodiment.

DETAILED DESCRIPTION OF THE PREFERRED EMBODIMENTS

The preferred embodiments of the present invention will now be described below with reference to the attached drawings. It is noted that the following embodiments are directed to the case where the present invention is applied to an information reproduction apparatus which reproduces digital information recorded on an information recording surface of a DVD-RAM in the form of pits.

[I] DVD-RAM

Figure 1:
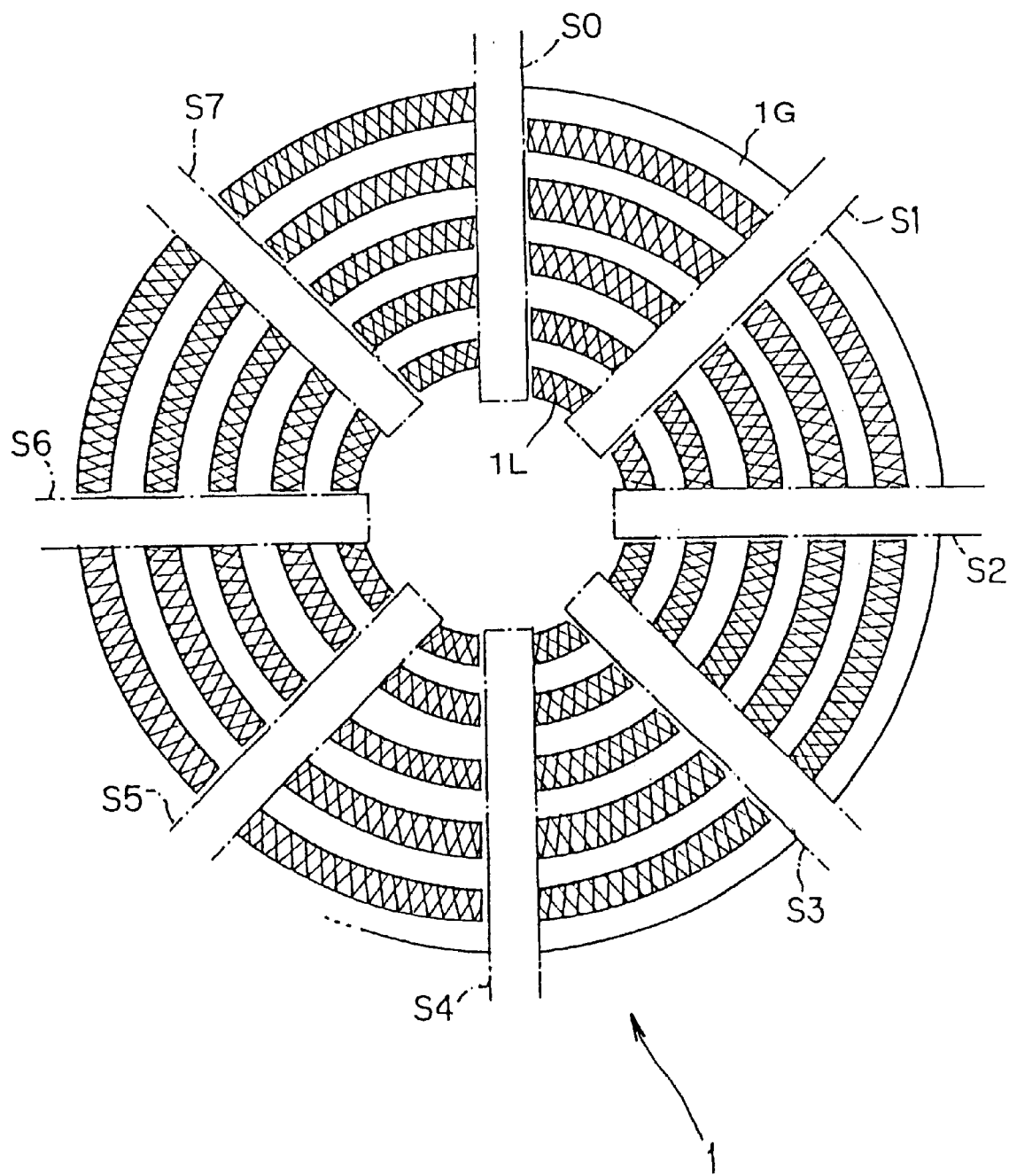
FIG. 1 is a plan view showing the recording format of the DVD-RAM.

Prior to the description of the configuration of the information reproduction apparatus, the recording format adopted in the DVD-RAM according to the present invention will be described with reference to FIGS. 1 to 3. A DVD-RAM has multiple zones divided in its radial direction. FIG. 1 is a plan view showing the track structure included in one of those zones, FIG. 2 is a magnified view of a part of the structure shown in FIG. 1, and FIG. 3 is a plan view showing a detailed structure of a header area described later.

As shown in FIG. 1, the DVD-RAM 1 adopts a so-called land/groove (L/G) recording system in which digital information is recorded on a groove track 1G and a land track 1L, both being formed in advance. In FIG. 1, the land track 1L is shown as the hatched portion while the groove track 1G is shown as the remaining white portion. In the DVD-RAM 1, a single land track 1L and a single groove track 1G are spirally formed with the header areas S0 to S7 being formed in the radial direction. The disc of this type is generally called as "Single Spiral-Land/Groove (SS-L/G)" recording system. The details of the SS-L/G recording system is disclosed, for example, in "THE ACCESS SYSTEM for SINGLE SPIRAL-LAND/GROOVE RECORDING, Nakano et al., SINGAKU TECHNICAL REPORT OF IEICE, MR95-88, CPM95-126(1996-02), ELECTRONIC INFORMATION COMMUNICATION INSTITUTION". Each of the land track 1L and the groove track 1G is partitioned into sectors, which are the predetermined information unit of the digital information to be recorded. As shown in FIG. 1, at the partitioning points, there are provided the header areas S0 to S7 carrying address information substantially indicating the recording position of digital information on the DVD-RAM 1 such as the sector number or the physical recording position on the DVD-RAM 1 of the following and/or proceeding sector on the land track 1L or the groove track 1G. The headers S0 to S7 are arranged with the same interval angle therebetween such that one header is located within one zone, as shown in FIG. 1. Reproducing the digital information recorded on the land track 1L or the groove track 1G between two neighboring header areas takes identical time period for all areas sandwiched by the header areas S0 to S7.

Next, the description will be given of the detailed configuration of the header. areas S0 to S7 by referring to FIGS. 2 and 3. FIG. 2 is a magnified view of the portions around the header area S0 and the header area S1. As shown, since the land track 1L and the groove track 1G have the single spiral form, the relative positions in the track direction of the land track 1L and the groove track 1G shift in the radial direction so that the land track 1L on the right side of the header area S0 is on the extension line of the groove track 1G on the left side of the header area S0 and the groove track 1G on the right side of the header area S0 is on the extension line of the land track 1L on the left side of the header area S0. It is noted that, unlike the header area S0, the relative positions of the land track 1L and the groove track 1G do not change suddenly around other header areas S1 to S7.

Figure 2:
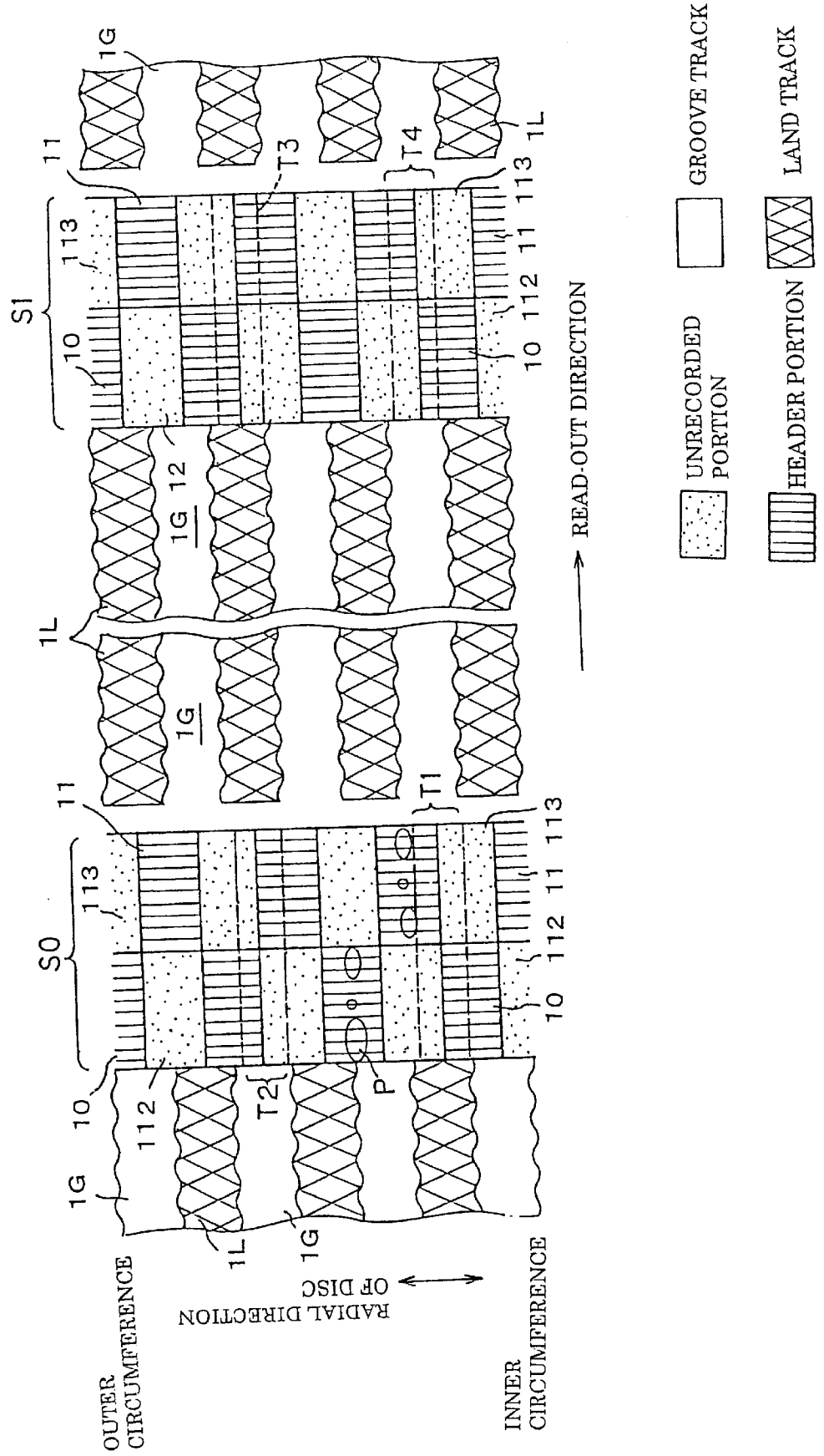
FIG. 2 is an magnified view showing the recording format of the DVD-RAM.

As shown in FIG. 2, each of the header areas S0 and S1 includes the header portions 10 and 11 on which the address information is recorded, and the non-recorded portions 112 and 113. The header portions 10 and 11 and the non-recorded portions 112 and 113 have the same width as the groove track 1G and the land track 1L. Each of the header portions 10 and 11 and the non-recorded portions 112 and 113 has the ½ length of the header areas S0 or S1 in the track (i.e., rotation) direction of the DVD-RAM 1. The header portions 10 and 11 and the non-recorded portions 112 and 113 are arranged in the zigzag manner as shown in FIG. 2, each being shifted with respect to the groove track 1G or the land track 1L by the length of ½ track in the radial direction of the DVD-RAM 1. The header portions 10 and 11 have the same structure as the groove track 1G, for example, and is provided with pit array P indicating the address information corresponding to the respective positions. The non-recorded portions 112 and 113 have the mirror-finished surface having the height at the same level as the surface of the land track 1L.

Supposing a virtual track T1 from the land track 1L to the groove track 1G along the track direction of the DVD-RAM 1, the header portion 10 is provided in the header area S0 with being shifted by the length of ½ track in the inner direction of the DVD-RAM 1 from the virtual track T1, and the header portion 11 is provided in the header area S0 with being shifted by the length of ½ track in the outer direction of the DVD-RAM 1 from the virtual track T1. Likewise, supposing a virtual track T2 from the groove track 1G to the land track L1 along the track direction, the header 10 is provided in the header area S0 with being shifted by the length of ½ track in the outer direction of the DVD-RAM 1 from the virtual track T2, and the header portion 11 is provided in the header area S0 with being shifted by the length of ½ track in the inner direction of the DVD-RAM 1 from the virtual track T2.

On the contrary, with respect to the other header areas S1 to S7, supposing a virtual track T3 from the land track 1L to the next land track 1L along the track direction of the DVD-RAM 1, the header 10 is provided with being shifted by the length of ½ track in the outer direction of the DVD-RAM 1 from the virtual track T3, and the header portion 11 is provided with being shifted by the length of ½ track in the inner direction of the DVD-RAM 1 from the virtual track T3. Likewise, supposing a virtual track T4 from the groove track 1G to the next groove track 1G along the track direction, the header 10 is provided with being shifted by the length of ½ track in the inner direction of the DVD-RAM 1 from the virtual track T4, and the header portion 11 is provided with being shifted by the length of ½ track in the outer direction of the DVD-RAM 1 from the virtual track T4.

In this way, the positions of the header portions 10 and 11 are different between the header area S0 and the other header areas S1 to S7. By this, an information reproduction apparatus described later can recognize whether or not the track changes from the land track 1L to the groove track 1G or from the groove track 1G to the land track 1L before and after the header area.

In FIG. 2, the land track 1L and the groove track 1G are formed in a wobbling manner. This wobbling is adopted to record a synchronizing signal for controlling the revolution speed of the spindle motor (described later) which rotates the DVD-RAM 1 at the time of recording/reproducing digital information. Namely, at the time of recording/reproducing digital information, the wobbling is detected and used to generate a reference signal which controls the rotation of the spindle motor. It is noted that such wobbling feature is omitted from the illustration in FIG. 1 for the sake of brevity. When digital information recorded on the DVD-RAM 1 is optically reproduced, the light beam of the laser light is converged to produce a light spot on the DVD-RAM 1. Then, the light reflected by the DVD-RAM 1 is received by a detector having a light receiving portions divided by a divisional line in parallel with the track direction to produce the reproduction signal.

Figure 3A:
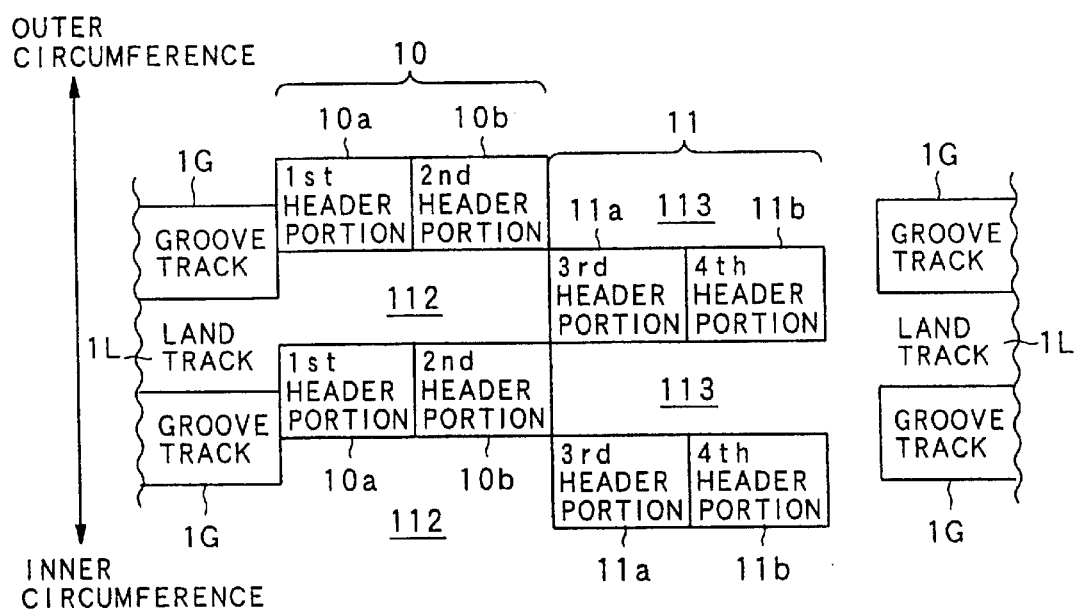
FIG. 3A is a diagram showing the detailed structure of the header area.

Next, the description will be given of the structure of the control information (including the aforementioned address information) recorded in the respective header portions 10 and 11 with reference to FIG. 3. FIG. 3 shows the structure of the header portions 10 and 11 within the header area S0 (in which the land track 1L and the groove track 1G are not on the same line in the track direction). As shown in FIG. 3A, the header portion 10 includes the first header portion 10a preceding in the rotation direction of the DVD-RAM 1 and the second header portion 10b following the first header portion 10a in the rotational direction. The header portion 11 includes the third header portion 11a preceding in the rotational direction and the fourth header portion 11b following the third header portion 11a in the rotational direction. The first header portion 10a has the same length as the third header portion 11a, and the second header portion 10b has the same length as the fourth header portion 11b. The first header portion 10a and the second header portion 10b are shifted by the ½ track length in the outer direction of the DVD-RAM 1 with respect to the center line of the groove track 1G, and the third header portion 11a and the fourth header portion 1b are shifted by the ½ track length in the inner direction of the DVD-RAM 1 with respect to the center line of the groove track 1G.

Figure 3B:
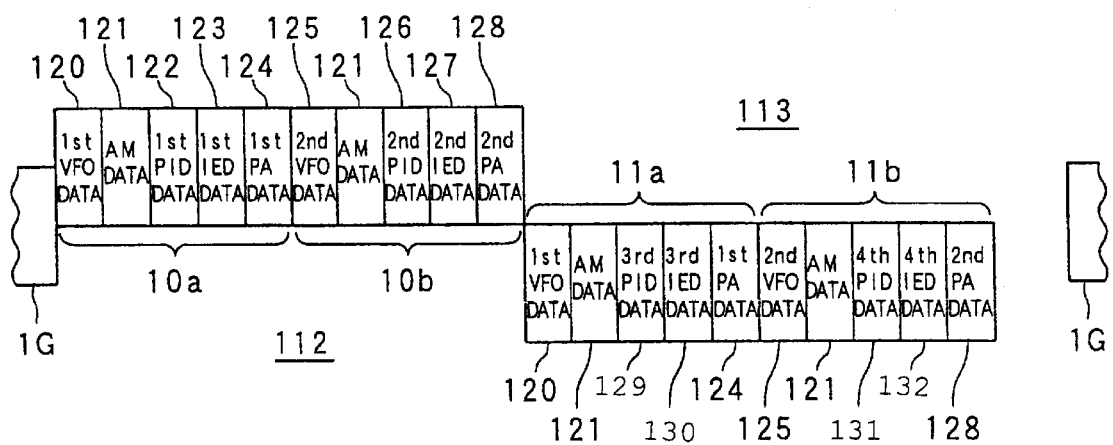
FIG. 3B is a diagram showing the data structure of each header portion.

Next, the description will be given of the structure of address information recorded, in advance, in the header portions by referring to FIG. 3B. As shown in FIG. 3B, the first header portion 10a includes the first VFO (Variable Frequency Oscillator (channel bit synchronization signal)) data 120 of 36-byte length. The first VFO data 120 includes the pit array P of a constant period used for controlling the revolution speed of the spindle motor (described later) which rotates the DVD-RAM 1. The pit array P has the period corresponding to 8×T if the unit length of the pits formed on the DVD-RAM 1 is defined as "T". Namely, in this case, plural pits having the length of 4×T are formed with the interval of the length 4×T therebetween. Further, the first header portion 10a includes 3-byte AM (Address Mark) data 121, 4-byte first PID (Physical Identification Data) 122, 2-byte first IED (ID Error Detection code) data 123 and 1-byte first PA (Post Amble) data 124. The AM data 121 is a synchronization signal used to read the following first PID data 122. The first PID data 122 includes address information (specifically, sector information and sector numbers) indicating the recorded position of the header area S1 on the DVD-RAM 1. The first IED data 123 includes error detection codes for detecting the first PID data 122. The first PA data 124 indicates the end of the first IED data 123.

The second header portion 10b includes 8-byte second VFO data 125, AM data 121, second PID data 126, second IED data 127 and second PA data 128. The second VFO data includes other pit array of a constant period used to control the revolution speed of the spindle motor. The second PID data 126 includes other address information indicating the recording position of the header area S1 on the DVD-RAM 1. The second IED data 127 includes error detection codes for detecting the second PID data 126 and the second PA data 128 indicates the end of the second IED data 127.

The third header portion 11a includes the first VFO data 120, the AM data 121, 4-byte third PID data 129 including still other address information indicating the recording position of the header area S1 on the DVD-RAM 1, 2-byte third IED data 130 including error detection codes for detecting the third PID data 129, and the first PA data 124. The fourth header portion 11b includes the second VFO data 125, the AM data 121, 4-byte fourth PID data 131 including still other address information indicating the recording position of the header area S1 on the DVD-RAM 1, 2-byte fourth IED data 132 including error detection codes for detecting the fourth PID data 126, and the second PA data 128.

The same data is recorded at the head of the first header portion 10a and at the head of the third header portion 11a, and the same data is recorded at the end of the first header portion 10a and at the end of the third header portion 11a. Likewise, the same data is recorded at the head of the second header portion 10b and at the head of the fourth header portion 11b, and the same data is recorded at the end of the second header portion 10b and at the end of the fourth header portion 11b. Since the data recorded at the heads of the first header portion 10a and the third header portion 11a are the same and the data recorded at the ends of the first header portion 10a and the third header portion 11a are the same (or, the data recorded at the heads of the second header portion 10b and the fourth header portion 11b are the same and the data recorded at the ends of the second header portion 10b and the fourth header portion 11b are the same), the same data can be reproduced at those portions if no radial tilt is taking place. By utilizing this, in the following embodiments, the radial tilt taking place in relation with the DVD-RAM 1 is detected and compensated for.

[II] 1st Embodiment of Information Reproduction Apparatus

Figure 4:
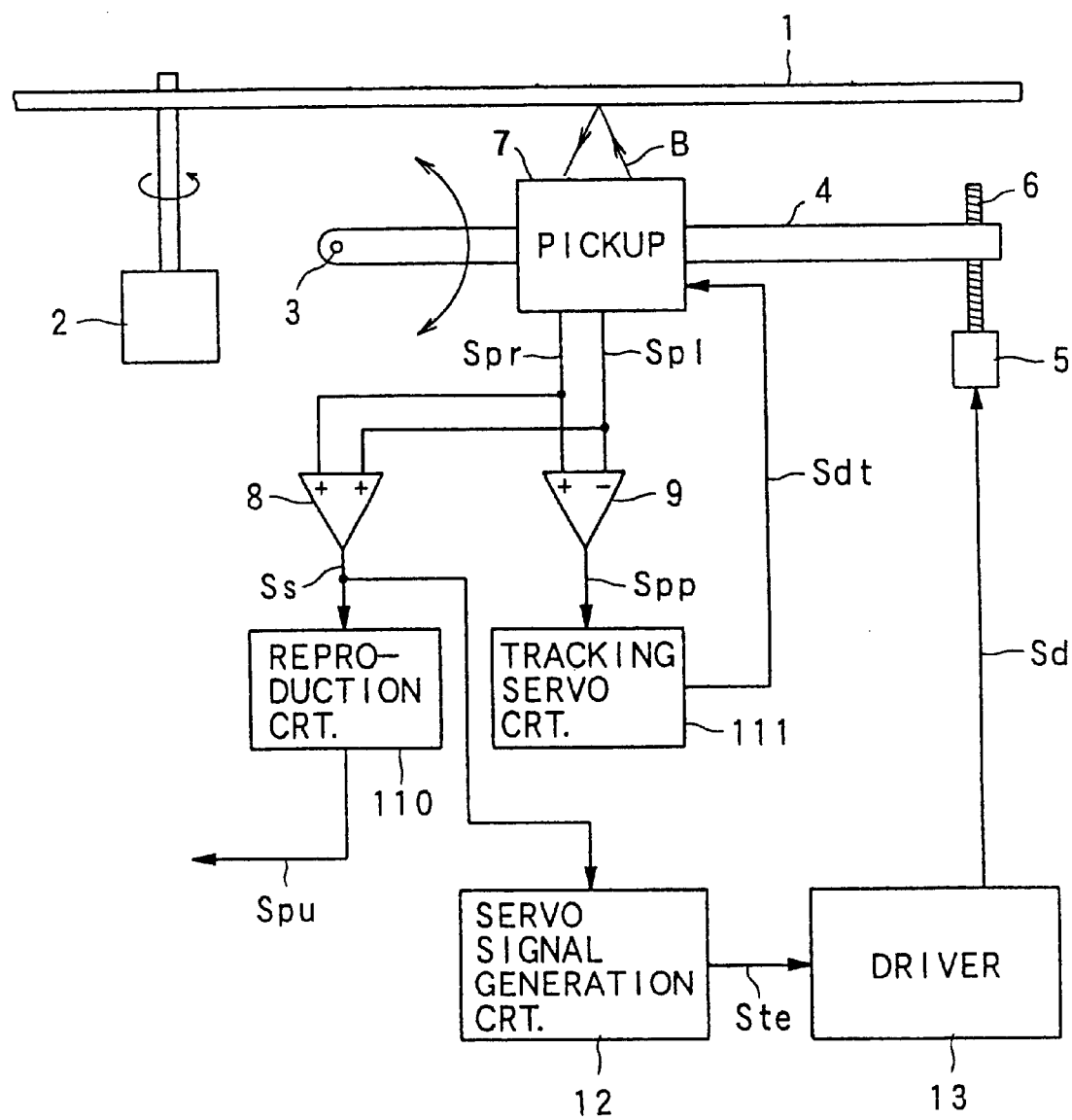
FIG. 4 is a block diagram showing the overall configuration of the information reproduction apparatus according to the first embodiment.
Figure 5:
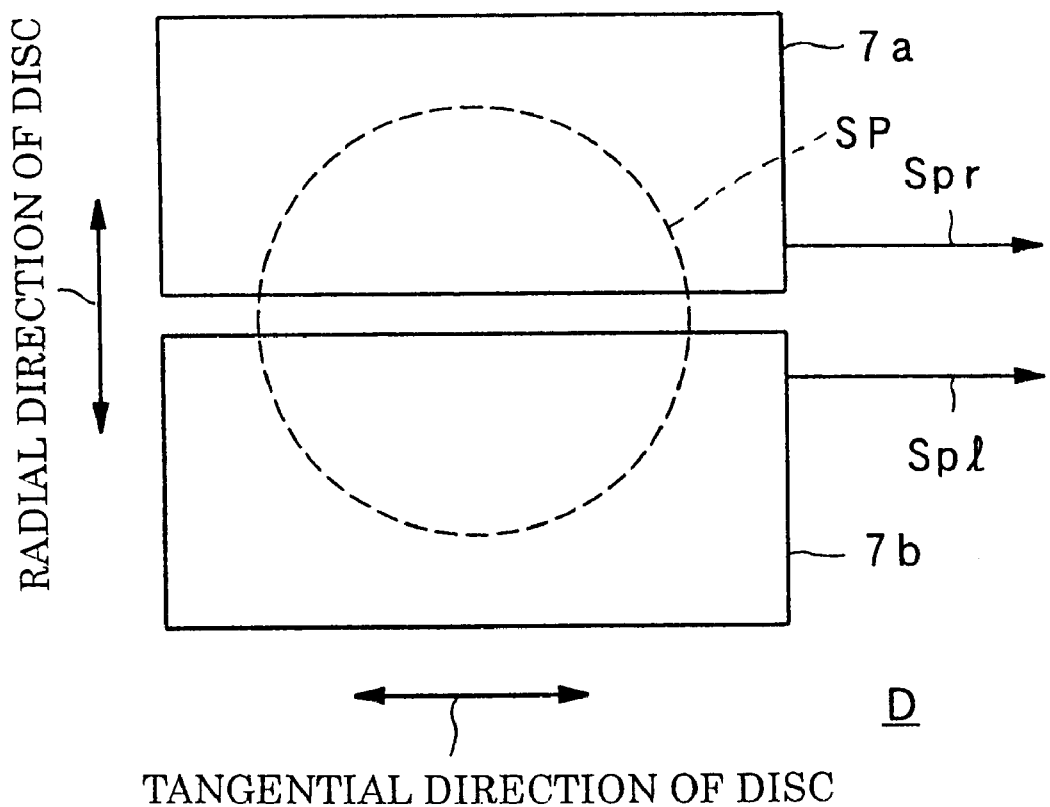
FIG. 5 is a plan view showing the configuration of the detector provided within the-pickup of the first embodiment.
Figure 6:
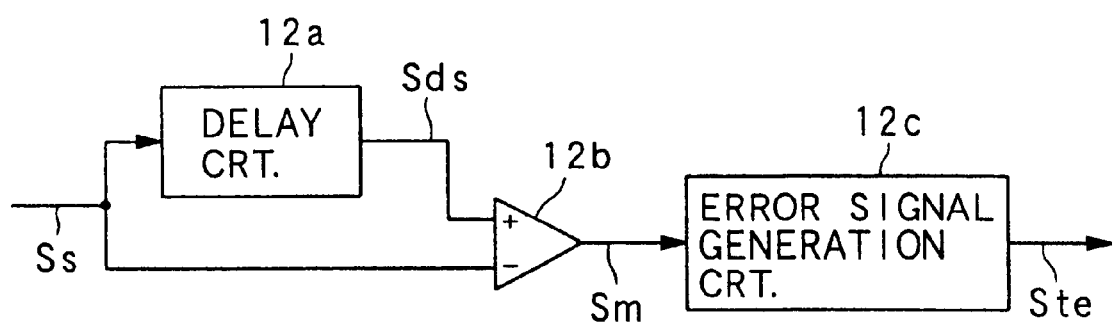
FIG. 6 is a block diagram showing the configuration of the servo signal generation circuit of the first embodiment.

Next, the first embodiment of the information reproduction apparatus according to the present invention will be described with reference to FIGS. 4 to 7. FIG. 4 is a block diagram showing the schematic configuration of the information reproduction apparatus according to the first embodiment, and FIG. 5 is a plan view showing the detailed configuration of the detector described later. FIG. 6 is a block diagram showing the servo signal generation circuit according to the first embodiment, and FIG. 7 is a waveform diagram explaining the generation of the tilt error signal according to the first embodiment.

First of all, the configuration of the information reproduction apparatus according to the first embodiment will be described. As shown in FIG. 4, the information reproduction apparatus SS1 of the first embodiment includes the spindle motor 2, the shaft 3, the arm 4, the motor 5, the screw 6. the pickup 7, the adder 8, the subtracter 9, the reproduction circuit 110, the tracking servo circuit 111, the servo signal generation circuit 12, and the driver 13. The pickup 7 includes a laser diode (not shown), the detector D divided into two half-detectors 7a and 7b by a divisional line in parallel with the rotation direction of the DVD-RAM 1 as shown in FIG. 5, a polarization beam splitter (not shown), and an objective lens (not shown). As shown in FIG. 6, the servo signal generation circuit 12 includes the delay circuit 12a, the subtracter 12b, and the error signal generation circuit 12c. The error signal generation circuit 12c may be designed as an averaging circuit or the like. It is noted that FIG. 4 shows only the components related to the present invention. In practice, the information reproduction apparatus SS1 includes servo control circuits such as a so-called focus servo control circuit and a so-called spindle servo control circuit in addition to the components shown in FIG. 4.

Next, the operation of the information reproduction apparatus SS1 will be described with reference to FIG. 4 to 7. First, the spindle motor 2 rotates the DVD-RAM 1 at a given revolution speed. Simultaneously, the pickup 7 irradiates the light beam B for information reproduction onto the DVD-RAM 1 at the position where information to be reproduced is recorded, and receives the reflected light by the detector D. All optical parts in the pickup 7 are arranged such that the reflected light produces the spot range SP on the detector D as shown in FIG. 5. The half-detectors 7a and 7b receive the reflected light and generate the received light signals Spr and Spl corresponding to the received light quantities, respectively. In addition, the pickup 7 is designed so as to be transferred on the arm 4 in the radial direction of the DVD-RAM 1 under the control of a carriage servo circuit (not shown), and the arm 4 is arranged to swing about the shaft 3 in the up-down direction indicated by the arrow in FIG. 4. The other end of the arm 4 moves up and down in the direction of the arrow by rotating the screw 6. With this arrangement, when the motor 5 is driven by a drive signal Sd (described later) to rotate the screw 6, the arm 4 swings in the direction of the arrow together with the pickup 7. By this movement, the radial tilt existing between the optical axis of the light beam B and the information recording surface of the DVD-RAM 1 is compensated for.

The adder 8 adds the received light signals Spr and Spl to each other to generate the detection signal Ss corresponding to information to be reproduced. Then, the adder 8 supplies the detection signal Ss to the reproduction circuit 110 and the servo signal generation circuit 12. The reproduction circuit 110 applies amplification and demodulation onto the detection signal Ss to generate the reproduction signal Spu corresponding to information to be reproduced, and supplies the reproduction signal Spu to a display and/or speakers (not shown). Simultaneously, the servo signal generation circuit 12 detects the radial tilt, which is now taking place between the optical axis of the light beam B and the information recording surface of the DVD-RAM 1, by using the detection signal Ss according to the detection processing described later. Then, the servo signal generation circuit 12 generate the tilt error signal Ste which indicates the quantity and the direction (i.e., in which direction the information recording surface is tilting with respect to the optical axis) of the detected radial tilt, and supplies the tilt error signal Ste to the driver 13. The driver 13 generates the drive signal Sd, which is used to compensate for the radial tilt now taking place, based on the tilt error signal Ste, and supplies it to the motor 5 so that the drive signal Sd drives the motor 5 to compensate for the radial tilt.

The subtracter 9 subtracts the received light signal Spl from the received light signal Spr to generate the push-pull signal Spp, which is a tracking error signal according to so-called push-pull method, and supplies it to the tracking servo circuit 111. The tracking servo circuit 111 generates the tracking drive signal Sdt which is used to compensate for the deviation in tracking direction of the position of the light beam B on the DVD-RAM 1 indicated by the push-pull signal Spp. Then, the tracking servo circuit 111 supplies the tracking drive signal Sdt to an actuator (not shown) provided within the pickup 7 to perform tracking servo control. Namely, the actuator moves the objective lens in the tracking direction of the DVD-RAM 1 based on the tracking drive signal Sdt to control the position of the light beam B.

Next, the description will be given of how the servo signal generation circuit 12 of the present invention generates the tilt error signal Ste with reference to FIGS. 6 and 7. As shown in FIG. 6, the detection signal Ss inputted to the servo signal generation circuit 12 is supplied to both the delay circuit 12a and the negative input terminal of the subtracter 12b. The delay circuit 12a detects the detection signal Ss corresponding to the first VFO data 120 within the header portion 10. Then, the delay circuit 12a delays the detection signal Ss for a time period in which the light beam B irradiated on the DVD-RAM 1 passes through the header portion 10 shown in FIG. 3 (namely, the time period required to detect all of the 64-byte data included in the header portion 10) to produce the delayed signal Sds, and supplied it to the positive input terminal of the subtracter 12b. By this, the detection signal Ss corresponding to the first VFO data 120 in the header portion 10 and the detection signal Ss corresponding to the first VFO data 120 in the header portion 11 are simultaneously supplied to the positive input terminal and the negative input terminal of the subtracter 12b, respectively. One method for detecting the detection signal Ss corresponding to the first VFO data 120 in the header portion 10 from the inputted detection signal Ss is as follows. In the DVD-RAM 1, the header area S0 to S7 are periodically arranged on the DVD-RAM 1 as shown in FIG. 1. Hence, the detection signal Ss corresponding to the first VFO data 120 in the header portion 10 may be detected by detecting the period of the header area arrangement in relation to the revolution speed of the DVD-RAM 1.

Figure 7A:
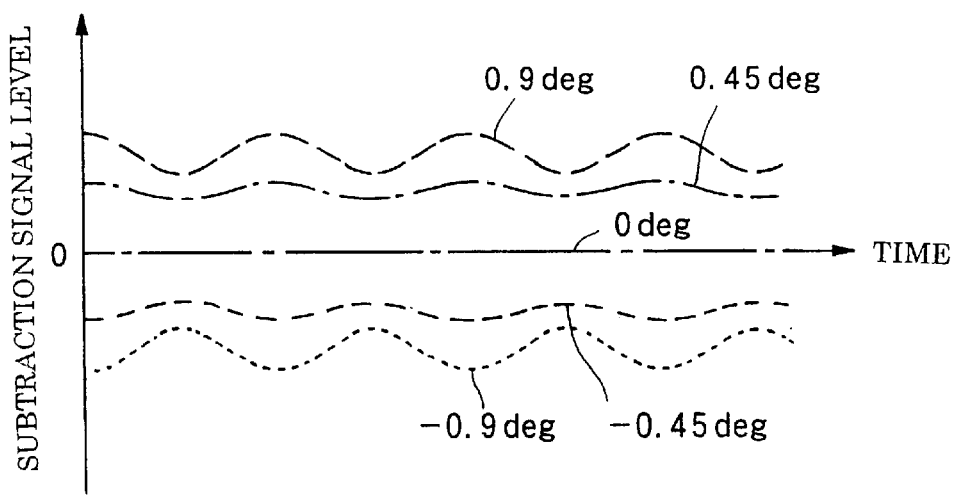
FIG. 7A is a graph showing the waveforms of the subtraction signals according to the first embodiment.

The subtracter 12*b* subtracts the detection signal Ss corresponding to the first VFO data 120 in the header portion 11 from the delay signal Sds (i.e., the detection signal Ss corresponding to the first VFO data 120 in the header portion 10) to generate the subtraction signal Sm, and supplies it to the error signal generation circuit 12*c*. The actual waveform of the subtraction signal Sm will be described with reference to FIG. 7A. FIG. 7A shows the waveforms of the subtraction signals Sm generated when the radial tilt are 0.9 degree (hereinafter indicated as "deg"), 0.45 deg., 0 deg. (i.e., no radial tilt existing), −0.45 deg., −0.9 deg. In addition, FIG. 7A shows the waveforms detected within a time period corresponding to a part of the first VFO data 120 in the header portion 10 or a part of the first VFO data 120 in the header portion 11. Therefore, in FIG. 7A, one period of each subtraction signal Sm corresponds to 8×T. As shown in FIG. 7A, when the quantity and the direction of the radial tilt occurring in relation with the DVD-RAM 1 change, the level and the waveform of the subtraction signal Sm change correspondingly. Specifically, when the radial tilt is 0 deg., the level of the subtraction signal Sm becomes zero level. As the absolute value of the radial tilt increases, the level of the subtraction signal Sm increases. If the radial tilt changes such that its direction remains the same but its absolute value changes, the subtraction signal Sm of the same polarity and different level is generated.

The reason why the subtraction signal Sm changes when the quantity and the direction of the radial tilt changes will be described below. As already mentioned, within the first VFO data 120 in the header portion 10 and the first VFO data 120 in the header portion 11, the same periodical signal is recorded. The periodical signal has a constant period and is used to extract the reference clock signal to control the revolution speed of the spindle motor 2. The header portions 10 and 11 are formed in a manner being shifted by the ½ track length in the opposite directions along the radial direction of the DVD-RAM 1 with respect to the center line of the groove track 1G, for example. Therefore, supposing that no radial tilt is occurring in relation to the DVD-RAM 1, the quantity of light that the half-detector 7*a* receives from the reflected light beam B reflected by the first VFO data 120 in the header portion 10 and the quantity of light that the half-detector 7*b* receives from the reflected light beam B reflected by the first VFO data in the header portion 11 are equal to each other, and hence the detection signals Ss outputted at respective timings have completely the same waveform. The subtraction signal Sm is produced by subtracting the non-delayed detection signal Ss (i.e., the detection signal Ss corresponding to the first VFO data 120 in the header 11) from the detection signal Ss delayed by the time period corresponding to the header portion 10 by means of the delay circuit 12*a*, and hence the subtraction signal Sm has zero level. However, if there is radial tilt in either direction in relation with the DVD-RAM 1, the quantity of light that the half-detector 7*a* receives from the reflected light beam B reflected by the first VFO data 120 in the header portion 10 and the quantity of light that the half-detector 7*b* receives from the reflected light beam B reflected by the first VFO data 120 in the header portion 11 are different from each other. This difference results from the fact that the optical path of the light beam reflected by the DVD-RAM 1 changes due to the tilt of the DVD-RAM 1.

Hence, the detection signals Ss outputted at respective timings have different waveforms from each other, and the difference varies in correspondence with the quantity and the direction of the radial tilt occurring. Thus, the subtraction signal Sm, which is produced by subtracting the non-delayed detection signal Ss from the detection signal Ss delayed by the time period corresponding to the header portion 10, has different level and polarity in correspondence with the quantity and the direction of the existing radial tilt, respectively.

Figure 7B:
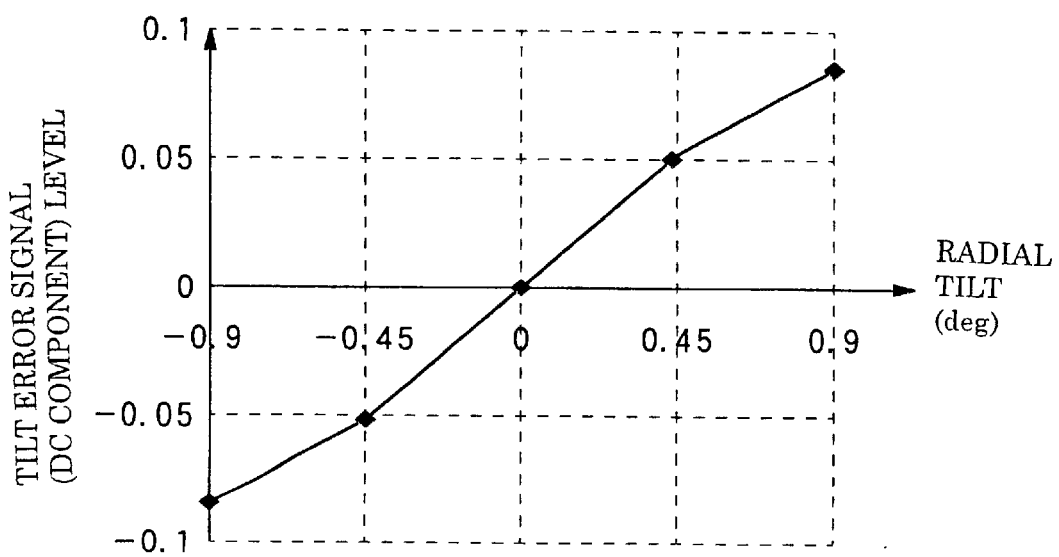
FIG. 7B is a graph showing the relation between the radial tilt and the tilt error signal according to the first embodiment.

Next, the error signal generation circuit 12*c* averages the subtraction signal Sm, having different level and polarity corresponding to the quantity and the direction of the radial tilt, using a predetermined averaging time period to extract the Direct Current (hereinafter referred to as "D.C.") component of the subtraction signal Sm. The level and the polarity of the D.C. component thus extracted changes in correspondence with the change of the level and the polarity of the subtraction signal Sm. Then, the error signal generation circuit 12*c* supplies the D.C. component, which level and polarity change in correspondence with the change of the subtraction signal Sm, to the driver 13 as the tilt error signal Ste. As shown in FIG. 7B, the level and the polarity of the tilt error signal thus generated have a linear function relation with the quantity and the direction of the existing radial tilt. Thus, by generating the drive signal Sd based on the tilt error signal Ste, it is possible to generate the drive signal Sd with which the existing radial tilt can be reliably compensated for. The above mentioned predetermined averaging time period is set to be long enough, compared with the one revolution time period of DVD-RAM 1, to remove the influence by the off-track component generated by the deviation of tracking of the light beam B that occurs due to the eccentricity of the DVD-RAM 1 itself (if this off-track exists, the subtraction signal does not become zero even if no radial tilt exists.). The reason is as follows. The off-track component has the period of one revolution of the DVD-RAM 1 while the radial tilt keeps on existing during plural revolutions of the DVD-RAM 1. Therefore, by averaging the subtraction signal Sm in the time period sufficiently longer than the one revolution time period of the DVD-RAM 1, the D.C. component changing only due to the radial tilt can be extracted as the tilt error signal Ste. Thereafter, as described above, the drive signal Sd is generated based on the tilt error signal Ste thus produced, and the motor 5 is driven by the drive signal Sd to compensate for the existing radial tilt.

As described above, according to the radial tilt compensation performed by the information reproduction apparatus SS1 of the first embodiment, the reflected light beam B from the first VFO data 120 in the header portion 10 and the first VFO data 120 in the header portion 11, which are formed in a shifted manner in the opposite directions along the radial direction of the DVD-RAM 1 with respect to the center line of the groove track 1G, are received, and then the radial tilt is detected based on the reflected lights thus received. Therefore, the radial tilt may be detected without separately providing a dedicated radial tilt sensor. Further, since the D.C. component in the subtraction signal Sm is extracted as the tilt error signal Ste indicative of the radial tilt, the quantity and the direction of the radial tilt may be accurately detected. Still further, since the subtraction signal Sm is averaged using the averaging time period corresponding to the revolution speed of the DVD-RAM 1 to extract the D.C. component, the quantity and the direction of the radial tilt may be reliably detected. As a result, the radial tilt existing in reproduction of information recorded on the DVD-RAM 1 may be detected and compensated for, without separately providing a dedicated tilt sensor, thereby enabling accurate information reproduction.

It is noted that the above described first embodiment is directed to an example in which the error signal generation circuit 12c is an averaging circuit for averaging the subtraction signal Sm with the averaging time period. Alternatively, the error signal generation circuit 12c may be a low-pass filter which has a cut-off frequency sufficiently lower than the revolution period of the DVD-RAM 1. With this alternative arrangement, the error signal generation circuit 12c may be the low-pass filter of simple configuration, and hence the quantity and the direction of the radial tilt can be accurately detected with simple configuration.

[III] 2nd Embodiment of Information Reproduction Apparatus

Figure 8:
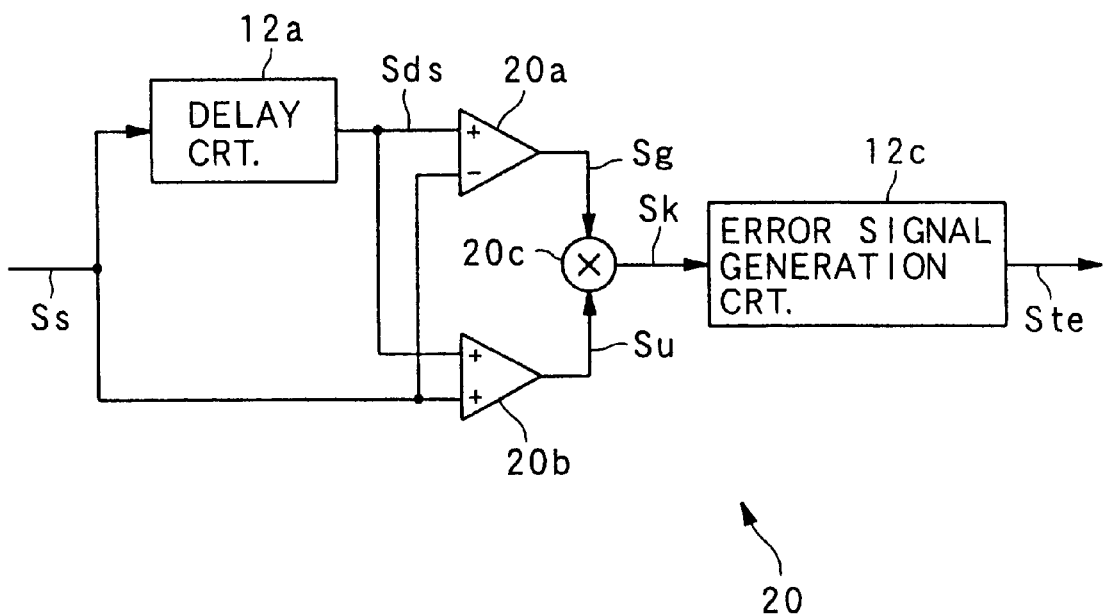
FIG. 8 is a block diagram showing the servo signal generation circuit of the second embodiment.
Figure 9A:
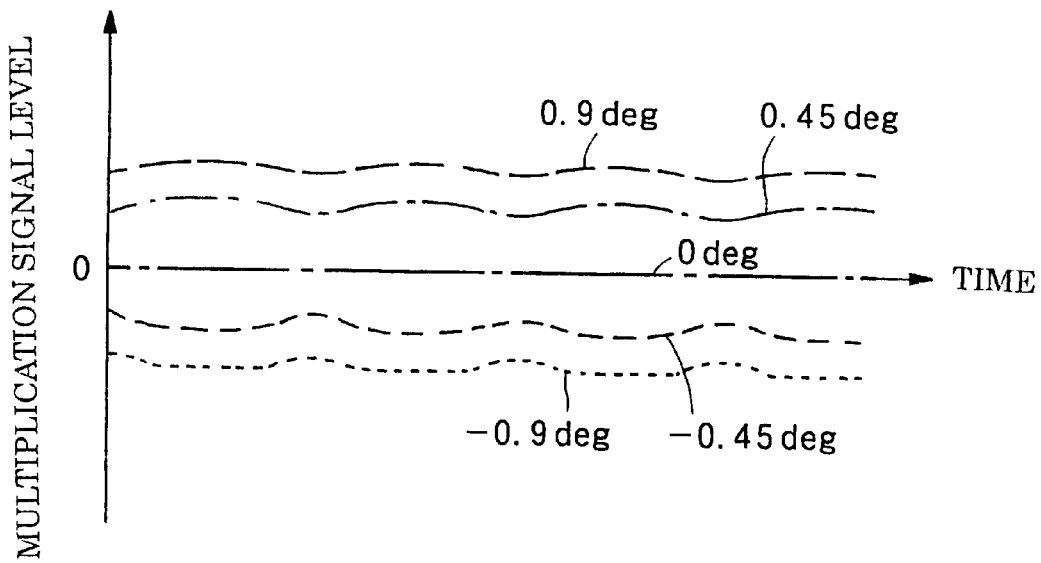
FIG. 9A is a graph showing the waveforms of the multiplication signals according to the second embodiment.

Next, the second embodiment of the information reproduction apparatus will be described with reference to FIGS. 8, 9A and 9B. FIG. 8 is a block diagram showing the configuration of the servo signal generation circuit of the second embodiment, and FIG. 9A shows the waveforms for explaining the generation of the tilt error signal according to the second embodiment. The information reproduction apparatus of the second embodiment differs, in configuration, from that of the first embodiment only in the configuration of the servo signal generation circuit, and other configuration is the same as that of the first embodiment. Therefore, the same components are indicated by the same reference numerals and their description will be omitted.

In the first embodiment, the detection signal Ss corresponding to the first VFO data 120 in the header portion 11 is subtracted from the detection signal Ss corresponding to the first VFO data 120 in the header portion 10 to generate the subtraction signal Sm, and then the error signal generation circuit 12c generates the tilt error signal Ste based on the subtraction signal Sm. In contrast, in the second embodiment, other operation is applied to the detection signal Ss corresponding to the first VFO data 120 in the header portion 10 and the detection signal Ss corresponding to the first VFO data 120 in the header portion 11, and the tilt error signal Ste is generated based on the operation result. Namely, as shown in FIG. 8, the servo signal generation circuit 20 includes the delay circuit 12a and the error signal generation circuit 12c, which have the same functions as those in the first embodiment, the subtracter 20a, the adder 20b, and the multiplier 20c. The subtracter 20a subtracts the non-delayed detection signal Ss from the delayed signal Sds outputted by the delay circuit 12a to generate the subtraction signal Sg, and supplies it to the multiplier 20c. The adder 20b adds the delay signal Sds to the non-delayed detection signal Ss to generate the addition signal Su, and supplies it to the multiplier 20c. The multiplier 20c multiplies the subtraction signal Sg by the addition signal Su to generate the multiplication signal Sk, and supplies it to the error signal generation circuit 12c. The error signal generation circuit 12c may be the averaging circuit or the low-pass filter like the case of the first embodiment, and extracts the D.C. component of the multiplication signal Sk to generate the tilt error signal Ste, and supplies it to the driver 13.

Next, the actual waveform of the multiplication signal Sk will be described with reference to FIG. 9A. FIG. 9A show the waveforms of the multiplication signal Sk generated when the radial tilt is 0.9 deg., 0.45 deg., 0 deg., −0.45 deg., −0.9 deg., respectively, similarly the case of the first embodiment shown in FIG. 7A, and one period of the respective multiplication signal Sk corresponds to 8×T. As seen in FIG. 9A, when the quantity and the direction of the radial tilt occurring in relation with the DVD-RAM 1 change, the level and the waveform of the multiplication signal Sk changes, similarly to the subtraction signal Sm of the first embodiment, and the tendency or characteristic of the change is the same as that of the subtraction signal Sm in the first embodiment. The reason why the multiplication signal Sk changes as shown in FIG. 9A when the quantity and the direction of the radial tilt change is identical to the case of the first embodiment. Namely, the first VFO data 120 in the header portion 10 and the first VFO data 120 in the header portion 11 are formed in a manner being shifted by ½ track length in the opposite directions along the radial direction of the DVD-RAM 1 with respect to the center line of the groove track 1G, and hence the received light quantity of the reflected light beam B from the respective first VFO data 120 changes in accordance with the quantity and the direction of the radial tilt.

Figure 9B:
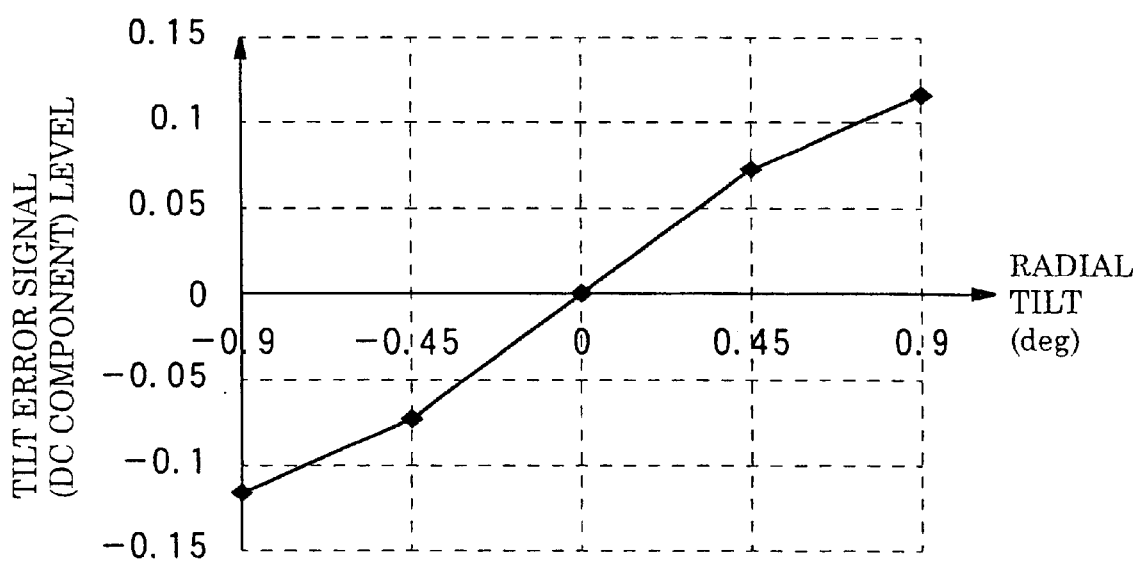
FIG. 9B is a graph showing the relation between the radial tilt and the tilt error signal according to the second embodiment.

As shown in FIG. 9B, the relation of the level and the polarity of the tilt error signal Ste obtained by extracting the D.C. component of the respective multiplication signals Sk by means of the error signal generation circuit 12c with respect to the quantity and the direction of the radial tilt is substantially the linear function, like the case of the first embodiment. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the second embodiment, the advantageous effect similar to that in the first embodiment can be achieved.

[IV] 3rd Embodiment of the Information Reproduction Apparatus

Figure 12A:
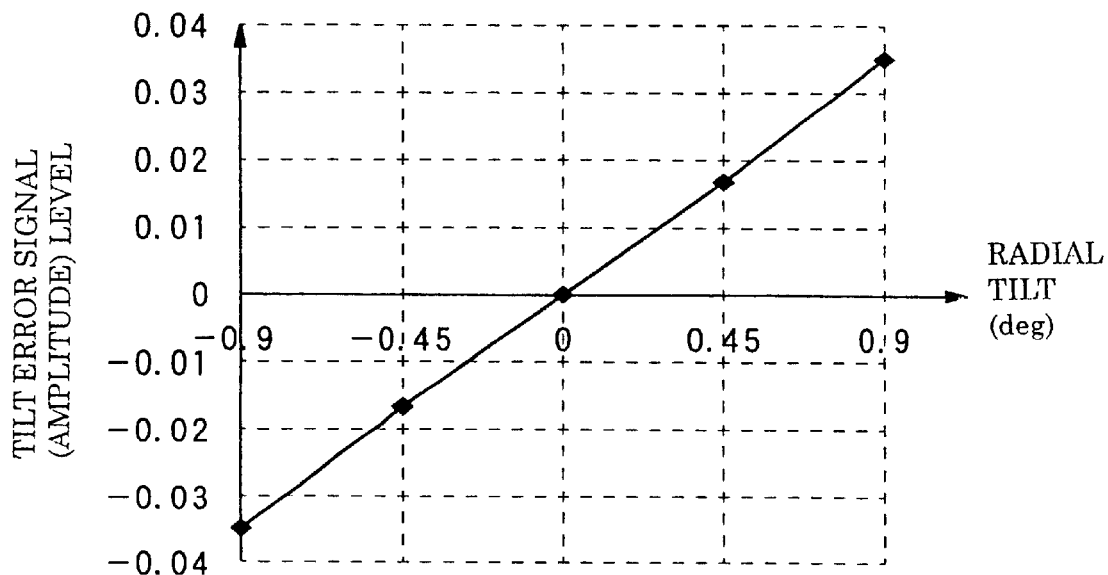
FIG. 12A is a graph showing the relation between the radial tilt and the tilt error signal according to the third embodiment.

Next, the third embodiment of the information reproduction apparatus according to the present invention will be described with reference to FIGS. 10 and 12B. FIG. 10 is a block diagram showing the configuration of the servo signal generation circuit according to the third embodiment, and FIG. 12A is a graph showing the relation of the level and the polarity of the tilt error signal with respect to the quantity and the direction of the radial tilt. The information reproduction apparatus of the third embodiment differs, in configuration, from that of the first embodiment only in the configuration of the servo signal generation circuit, and other configuration is the same as that of the first embodiment. Therefore, the same components are indicated by the same reference numerals and their description will be omitted.

In the first embodiment, the detection signal Ss corresponding to the first VFO data 120 in the header portion 11 is subtracted from the detection signal Ss corresponding to the first VFO data 120 in the header portion 10 to generate the subtraction signal Sm, and then the error signal generation circuit 12c generates the tilt error signal Ste based on the subtraction signal Sm. In contrast, in the third embodiment, the amplitude of the subtraction signal Sm is detected, and the error signal generation circuit 12c generates the tilt error signal Ste based on the change of the amplitude thus detected. Namely, as shown in FIG. 10, the servo signal generation circuit 21 of the third embodiment includes the delay circuit 12a, subtracter 12b and the error signal generation circuit 12c, which have the same functions as those in the first embodiment, and the amplitude detection circuit 21a. The amplitude detection circuit 21a detects the amplitude of the subtraction signal Sm (having completely the same waveform as in the case of first embodiment shown in FIG. 7A) corresponding to the radial tilt and outputted by the subtracter 12b, and supplies the detected amplitude to the error signal generation circuit 12c as the amplitude signal Sa. The error signal generation circuit 12c may be the averaging circuit or the low-pass filter like the case of the first embodiment, and extracts the D.C. component of the amplitude signal Sa to generate the tilt error signal Ste, and supplies it to the driver 13.

As shown in FIG. 12A, the relation of the level and the polarity of the tilt error signal Ste obtained by extracting the D.C. component of the respective amplitude signals Sa by means of the error signal generation circuit 12c with respect to the quantity and the direction of the radial tilt is substantially the linear function, like the case of the previous embodiments. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the third embodiment, the advantageous effect similar to that in the first embodiment can be achieved.

[V] 4th Embodiment of Information Reproduction Apparatus

Figure 11:
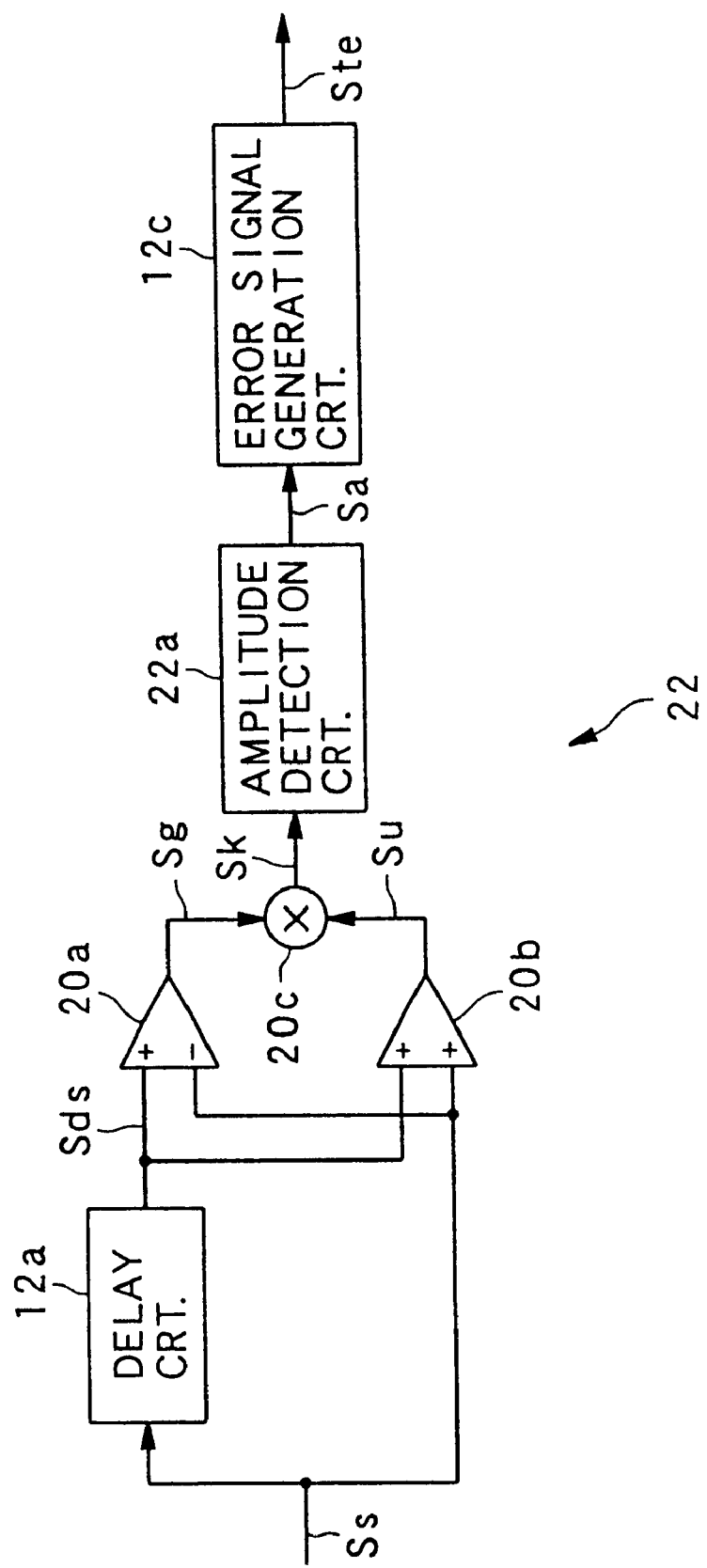
FIG. 11 is a block diagram showing the configuration of the servo signal generation circuit of the fourth embodiment.

Next, the fourth embodiment of the information reproduction apparatus according to the present invention will be described with reference to FIGS. 11 and 12B. FIG. 11 is a block diagram showing the configuration of the servo signal generation circuit of the fourth embodiment, and FIG. 12B is a graph showing the relation of the level and the polarity of the tilt error signal with respect to the quantity and the direction of the radial tilt.

The information reproduction apparatus of the fourth embodiment differs, in configuration, from that of the first embodiment only in the configuration of the servo signal generation circuit, and other configuration is the same as that of the first embodiment. Therefore, the same components are indicated by the same reference numerals and their description will be omitted.

In the second embodiment, the detection signal Ss corresponding to the first VFO data 120 in the header portion 11 is subtracted from the detection signal Ss corresponding to the first VFO data 120 in the header portion 10 to generate the subtraction signal Sg, and those detection signals Ss are added to each other to produce the addition signal Su. Then, the D.C. component in the multiplication signal Sk, obtained by multiplying the subtraction signal Sg by the addition signal Su, is extracted by the error generation circuit 12c and outputted as the tilt error signal Ste. In the fourth embodiment, the amplitude of the multiplication signal Sk is detected, and the error signal generation circuit 12c generates the tilt error signal Ste based on the change of the amplitude thus detected.

Namely, as shown in FIG. 11, the servo signal generation circuit 20 includes the delay circuit 12a, the subtraction circuit 20a, the adder 20b, the multiplier 20c and the error signal generation circuit 12c, which have the same functions as those in the second embodiment, respectively. The servo signal generation circuit 22 further includes the amplitude detection circuit 22a which extracts the amplitude of the multiplication signals Sk corresponding to the radial tilt and outputted by the multiplier 12c, and supplies it to the error signal generation circuit 12c. The error signal generation circuit 12c extracts the D.C. component of the amplitude signal Sa for the respective radial tilts, similarly to the case of the second embodiment, to produce the tilt error signal Ste, and supplies it to the driver 13.

Figure 12B:
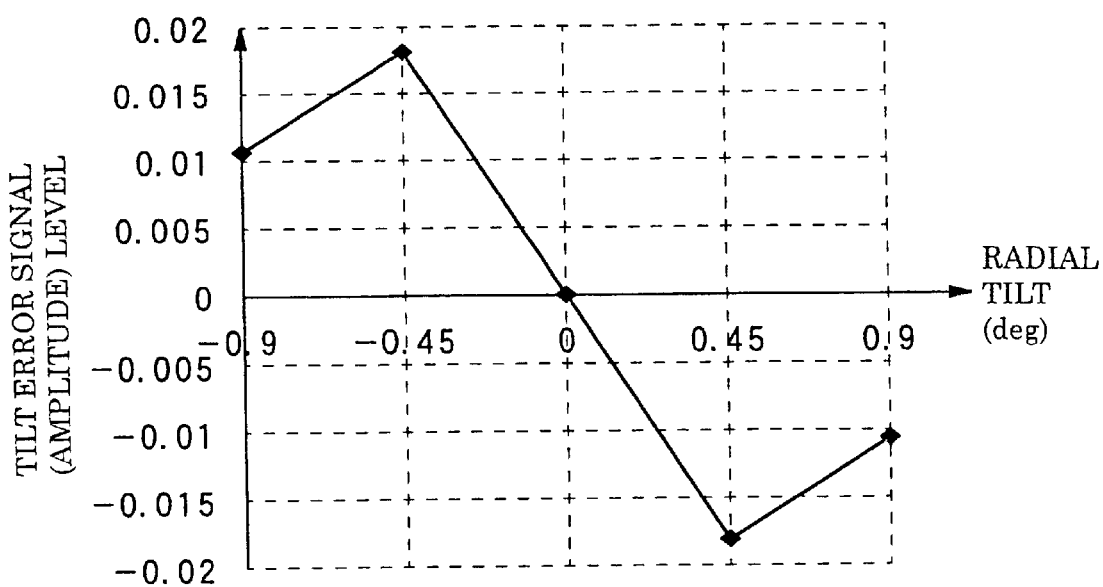
FIG. 12B is a graph showing the relation between the radial tilt and the tilt error signal according to the fourth embodiment.

As shown in FIG. 12B, the relation of the level and the polarity of the tilt error signal Ste obtained by extracting the D.C. component of the respective amplitude signals Sa by means of the error signal generation circuit 12c with respect to the quantity and the direction of the radial tilt is substantially the linear function in the range from −0.45 deg. to +0.45 deg., like the case of the previous embodiments. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the fourth embodiment, the amplitude of the multiplication signal Sk is detected and the tilt error signal Ste is produced based on the amplitude thus detected. Therefore, the advantageous effect similar to that in the first embodiment can be achieved.

[VI] 5th Embodiment of Information Reproduction Apparatus

Figure 13:
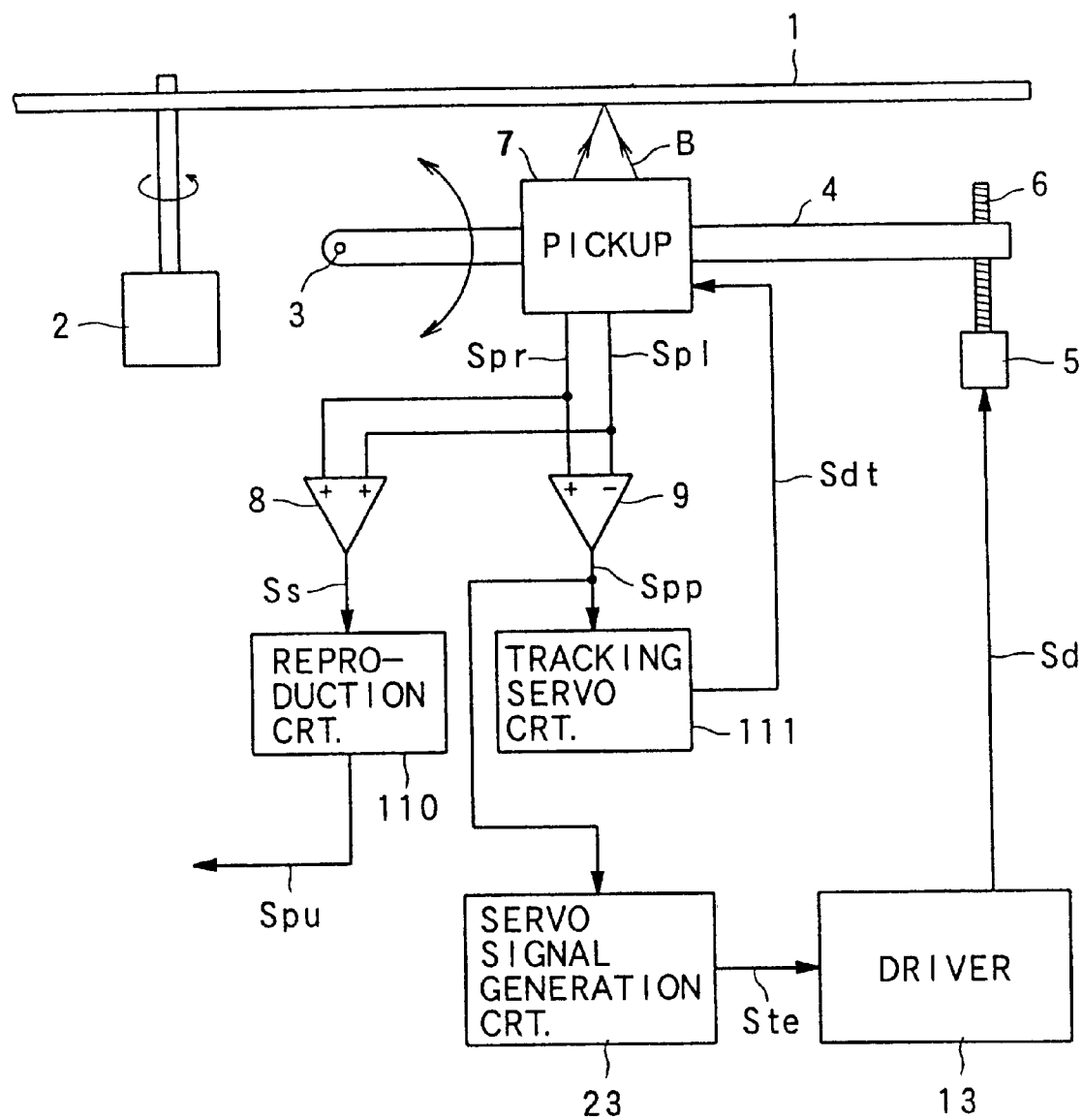
FIG. 13 is a block diagram showing the overall configuration of the information reproduction apparatus according to the fifth embodiment.
Figure 14:
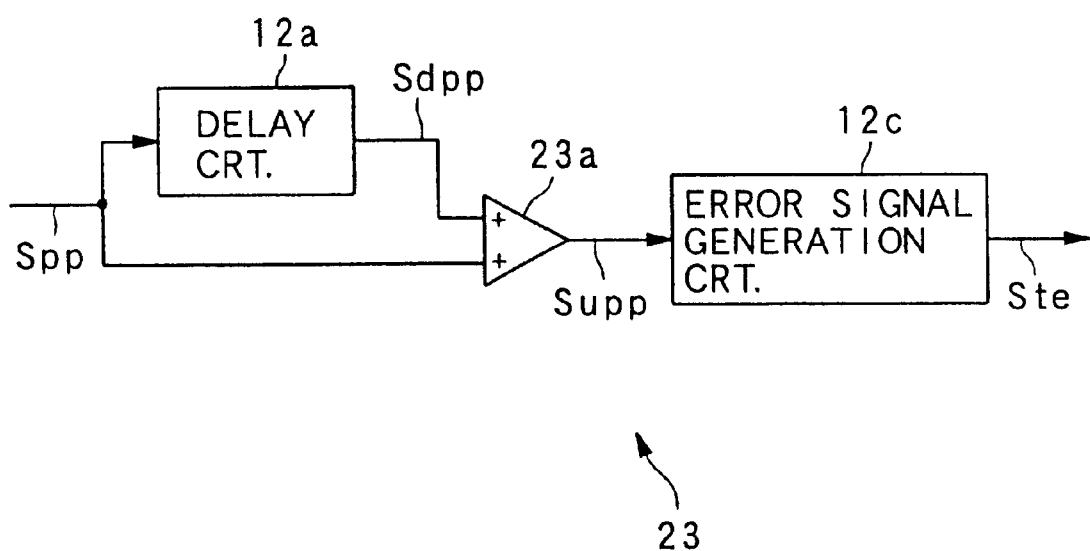
FIG. 14 is a block diagram showing the configuration of the servo signal generation circuit of the fifth embodiment.
Figure 15A:
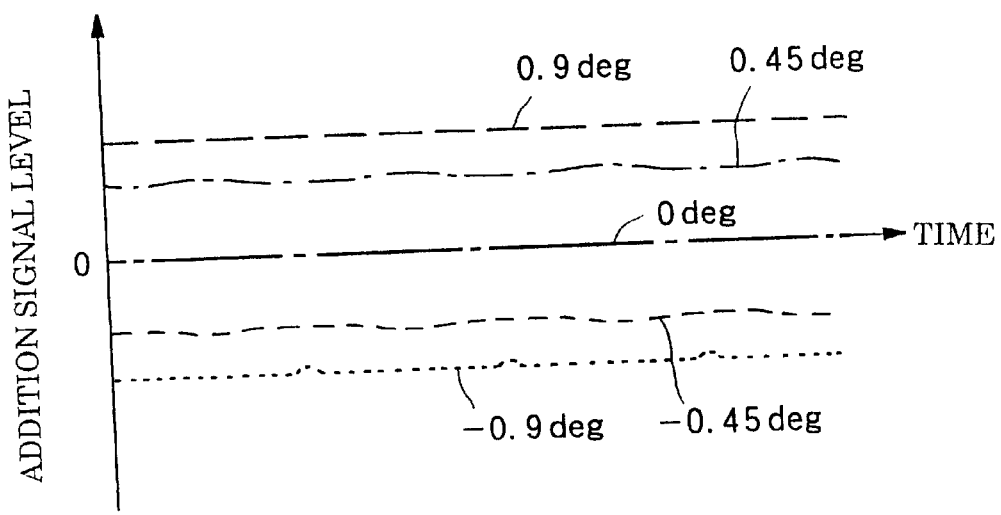
FIG. 15A is a graph showing the waveforms of the addition signals according to the fifth embodiment.
Figure 15B:
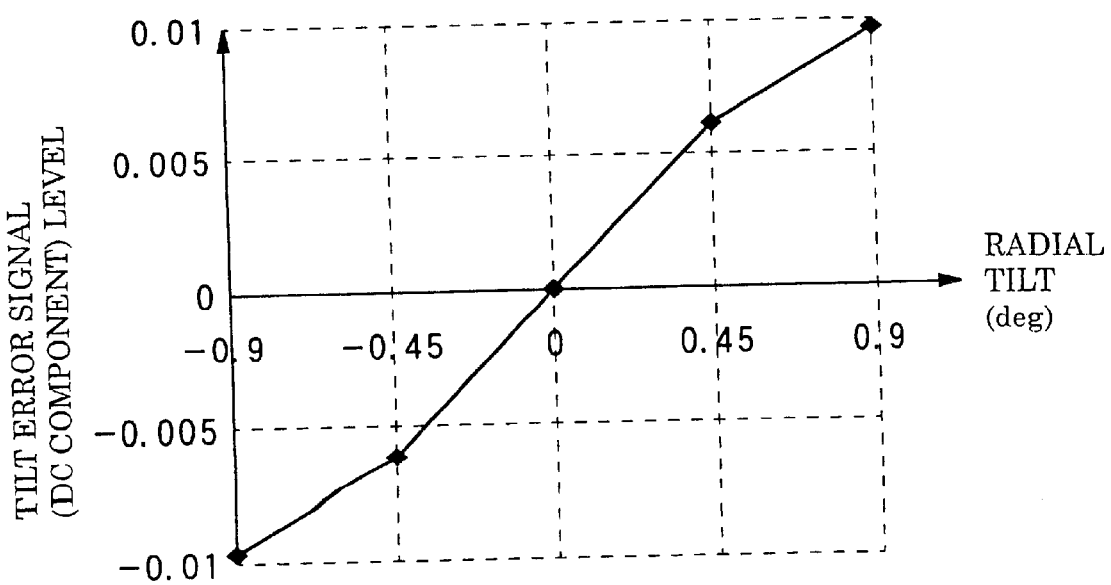
FIG. 15B is a graph showing the relation between the radial tilt and the tilt error signal according to the fifth embodiment.

Next, the fifth embodiment of the information reproduction apparatus according to the present invention will be described with reference to FIGS. 13 to 15. FIG. 13 is a block diagram showing the schematic configuration of the information reproduction apparatus of the fifth embodiment, FIG. 14 is a block diagram showing the configuration of the servo signal generation circuit of the fifth embodiment, and FIGS. 15A and 15B are graphs for explaining the generation of the tilt error signal.

First, the configuration of the information reproduction apparatus of the fifth embodiment will be described. As shown in FIG. 13, the information reproduction apparatus SS5 of the fifth embodiment includes the same components as those of the first embodiment except for the servo signal generation circuit 23. Further, the information reproduction apparatus SS5 is different from that of the first embodiment in that the push-pull signal Spp outputted by the subtracter 9 is supplied to the servo signal generation circuit 23. In FIGS. 13 and 14, the same components as those in the information reproduction apparatus SS1 are indicated by the same reference numerals and the detailed description therefor will be omitted. The servo signal generation circuit 23 includes, as shown in FIG. 14, the delay circuit 12a and the error signal generation circuit 12c, which are the same as those in the first embodiment, and the adder 23a.

Next, the operation of the servo signal generation circuit 23 according to the fifth embodiment will be described with reference to FIGS. 14 and 15. As shown in FIG. 14, the servo signal generation circuit 23 detects the radial tilt presently occurring by the later-described processing using the push-pull signal Spp, generates the tilt error signal Ste indicating the quantity and the direction of the radial tilt, and supplies it to the driver 13. Specifically, the push-pull signal Spp inputted to the servo signal generation circuit 23 is supplied to one input terminal of the adder 23a and the delay circuit 12a. The delay circuit 12a delays the push-pull signal Spp corresponding to the first VFO data 120 in the header portion 10 for the delay time period by which the irradiated range of the light beam B on the DVD-RAM 1 passes through the region of the header portion 10 shown in FIG. 3 according to the same delaying operation as that of the first embodiment, and supplies it to the other input terminal of the adder 23a as the delay signal Sdpp. By this, the push-pull signal Spp corresponding to the first VFO data 120 in the header portion 10 and the push-pull signal Spp corresponding to the first VFO data 120 in the header portion 11 are simultaneously supplied to the input terminals of the adder 23a, respectively. The method of detecting the push-pull signal Spp corresponding to the first VFO data 120 in the header portion 10 from the inputted push-pull signal Spp may be the same as that employed in the first embodiment. The adder 23a adds the delay signal Sdpp (i.e., the push-pull signal corresponding to the first VFO data 120 in the header 10) to the push-pull signal Spp corresponding to the VFO data 120 in the header portion 11 to generate the addition signal Supp, and supplies it to the error signal generation circuit 12c.

The actual waveform of the addition signal Supp will be described with reference to FIG. 15A. It is noted that FIG. 15A shows the waveforms of the addition signal Supp when the radial tilt is 0.9 deg., 0.45 deg., 0 deg., −0.45 deg., −0.9 deg., respectively, like the cases of the previous embodiments. In addition, one period in each waveform corresponds to 8×T.

As seen in FIG. 15A, when the quantity and the direction of the radial tilt occurring in relation with the DVD-RAM 1 change, the level and the waveform of the addition signal Supp change, similarly to the subtraction signal Sm of the first embodiment, and the tendency or characteristic of the change is the same as that of the subtraction signal Sm in the first embodiment. The reason why the addition signal Supp changes as shown in FIG. 15A when the quantity and the direction of the radial tilt changes is identical to the case of the first embodiment. Namely, the first VFO data 120 in the header portion 10 and the first VFO data 120 in the header portion 11 are formed in a manner being shifted by ½ track length in the opposite directions along the radial direction of the DVD-RAM 1 with respect to the center line of the groove track 1G, and hence the received light quantity of the reflected light beam B from the respective first VFO data 120 changes in accordance with the quantity and the direction of the radial tilt.

As shown in FIG. 15B, the relation of the level and the polarity of the tilt error signal Ste obtained by extracting the D.C. component of the respective addition signals Supp by means of the error signal generation circuit 12c with respect to the quantity and the direction of the radial tilt is substantially the linear function like the case of the first embodiment. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the fifth embodiment, the advantageous effect similar to that in the first embodiment can be achieved.

[VII] 6th Embodiment of Information Reproduction Apparatus

Figure 16A:
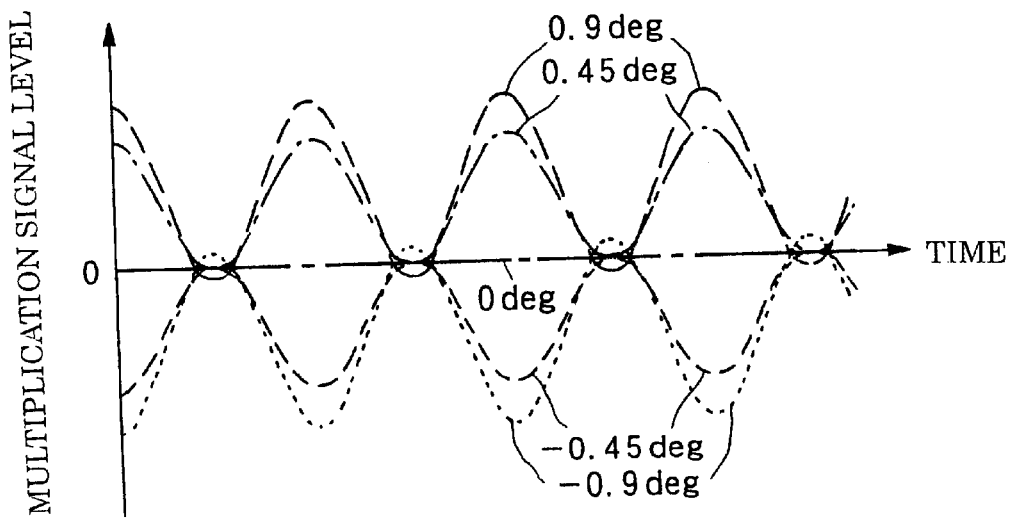
FIG. 16A is a graph showing the waveforms of the multiplication signals according to the sixth embodiment.

Next, the sixth embodiment of the information reproduction apparatus according to the present invention will be described with reference to FIGS. 16A and 16B. FIG. 16A shows the waveforms for explaining the generation of the tilt error signal according to the sixth embodiment. The information reproduction apparatus of the sixth embodiment differs, in configuration, from that of the fifth embodiment only in the configuration of the servo signal generation circuit, and other configuration is the same as that of the fifth embodiment. Therefore, the same components are indicated by the same reference numerals and their description will be omitted.

In the fifth embodiment, the push-pull signal Spp corresponding to the first VFO data 120 in the header portion 10 is added to the push-pull signal Spp corresponding to the first VFO data 120 in the header portion 11 to generate the addition signal Supp, and then the error signal generation circuit 12c generates the tilt error signal Ste based on the addition signal Supp. In contrast, in the sixth embodiment, other operation is applied to the push-pull signal Spp corresponding to the first VFO data 120 in the header portion 10 and the push-pull signal Spp corresponding to the first VFO data 120 in the header portion 11, and the tilt error signal Ste is generated based on the operation result. The configuration of the servo signal generation circuit according to the sixth embodiment is obtained by replacing the detection signal Ss inputted in the configuration of the servo signal generation circuit of the second embodiment with the above-mentioned push-pull signal Spp, and hence the configuration will be described below by referring to FIG. 8 to simplify the illustration.

Namely, the servo signal generation circuit of the sixth embodiment includes the delay circuit 12a and the error signal generation circuit 12c, which have the same functions as those in the fifth embodiment, the subtracter, the adder, and the multiplier. The subtracter subtracts the non-delayed push-pull signal Spp from the delayed signal of the sixth embodiment (i.e., the push-pull signal Spp delayed by the delay circuit 12a) outputted by the delay circuit 12a to generate the subtraction signal of the sixth embodiment, and supplies it to the multiplier. The adder adds the delay signal of the sixth embodiment to the non-delayed push-pull signal to generate the addition signal of the sixth embodiment, and supplies it to the multiplier. The multiplier multiplies the subtraction signal of the sixth embodiment by the addition signal of the sixth embodiment to generate the multiplication signal of the sixth embodiment, and supplies it to the error signal generation circuit 12c. The error signal generation circuit 12c may be the averaging circuit or the low-pass filter like the case of the fifth embodiment, and extracts the D.C. component of the multiplication signal of the sixth embodiment to generate the tilt error signal Ste, and supplies it to the driver 13.

Next, the actual waveform of the multiplication signal of the sixth embodiment will be described with reference to FIG. 16A. FIG. 16A shows the waveforms of the multiplication signals of the sixth embodiment generated when the radial tilt is 0.9 deg., 0.45 deg., 0 deg., −0.45 deg., −0.9 deg., respectively, similarly the case of the previous embodiments, and one period of the respective multiplication signal corresponds to 8×T. As seen in FIG. 16A, when the quantity and the direction of the radial tilt occurring in relation with the DVD-RAM 1 change, the level and the waveform of the multiplication signal of the sixth embodiment change, similarly to the cases in the previous embodiments, and the tendency or characteristic of the change is the same as that of the addition signal Supp in the fifth embodiment. The reason why the multiplication signal changes as shown in FIG. 16A when the quantity and the direction of the radial tilt changes is identical to the case of the fifth embodiment. Namely, the first VFO data 120 in the header portion 10 and the first VFO data 120 in the header portion 11 are formed in a manner being shifted by ½ track length in the opposite directions along the radial direction of the DVD-RAM 1 with respect to the center line of the groove track 1G, and hence the received light quantity of the reflected light beam B from the respective first VFO data 120 changes in accordance with the quantity and the direction of the radial tilt.

Figure 16B:
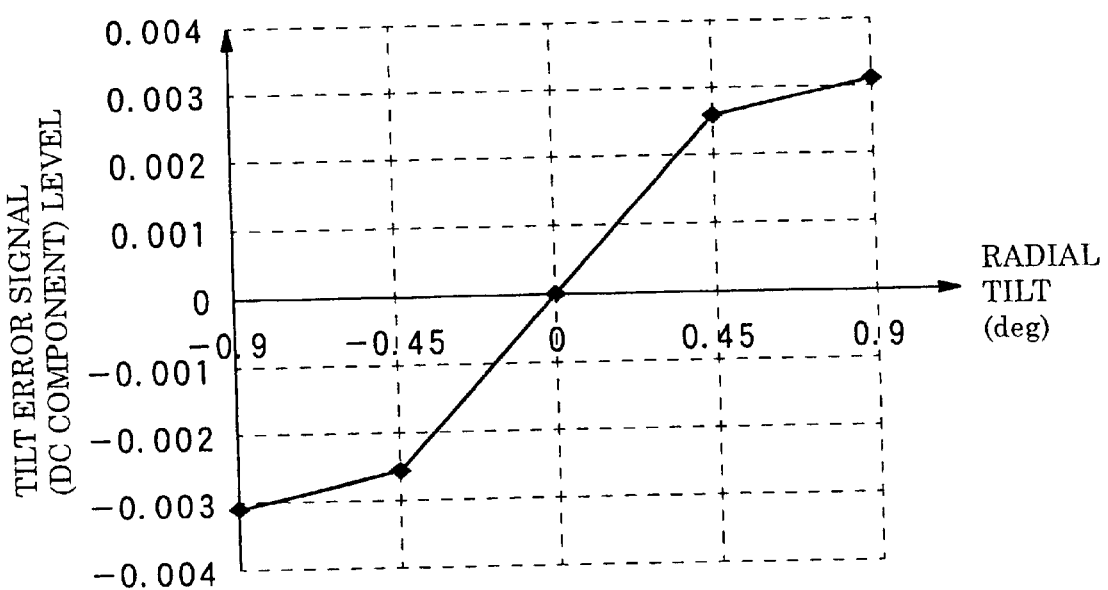
FIG. 16B is a graph showing the relation between the radial tilt and the tilt error signal according to the sixth embodiment.

As shown in FIG. 16B, the relation of the level and the polarity of the tilt error signal Ste obtained by extracting the D.C. component of the multiplication signal of the sixth embodiment by means of the error signal generation circuit 12c with respect to the quantity and the direction of the radial tilt is substantially the linear function like the case of the fifth embodiment. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the sixth embodiment, the advantageous effect similar to that in the fifth embodiment can be achieved.

Figure 17:
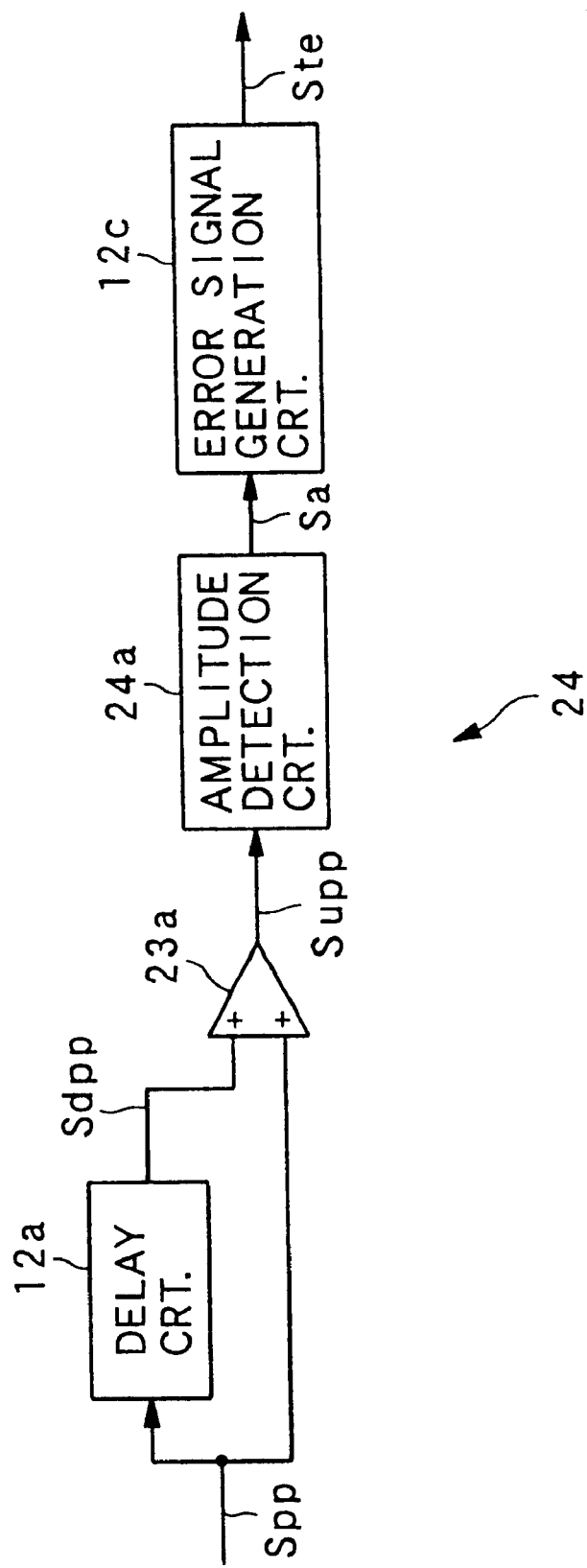
FIG. 17 is a block diagram showing the configuration the servo signal generation circuit of the seventh embodiment.
Figure 18A:
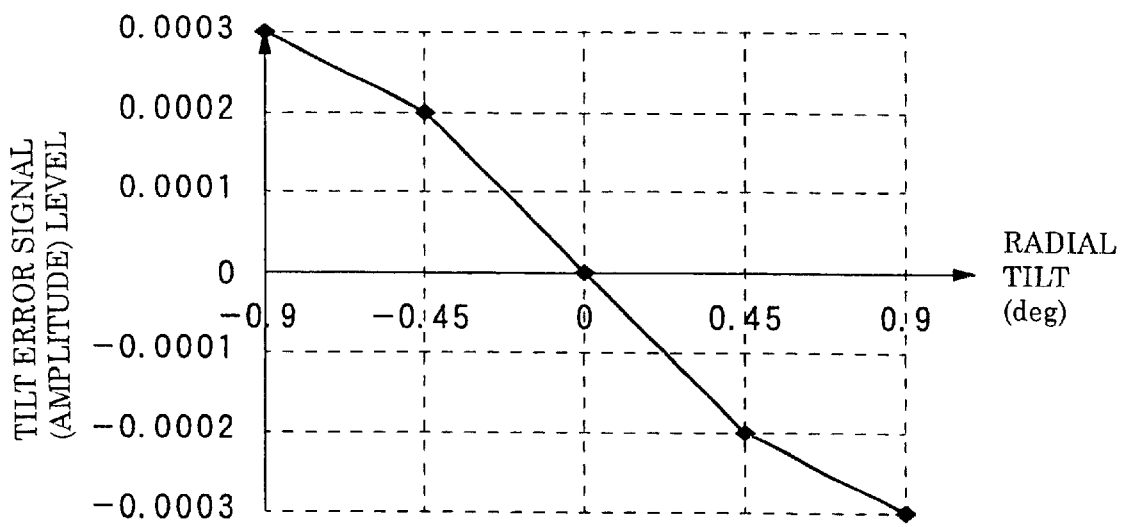
FIG. 18A is a graph showing the relation between the radial tilt and the tilt error signal according to the seventh embodiment.

[VIII] 7th Embodiment of Information Reproduction Apparatus Next, the seventh embodiment of the information reproduction apparatus according to the present invention will be described with reference to FIGS. 17 and 18A. FIG. 17 is a block diagram showing a servo signal generation circuit according to the seventh embodiment, and FIG. 18A shows the waveforms for explaining the generation of the tilt error signal according to the seventh embodiment. The information reproduction apparatus of the seventh embodiment differs, in configuration, from that of the fifth embodiment only in the configuration of the servo signal generation circuit, and other configuration is the same as that of the fifth embodiment. Therefore, the same components are indicated by the same reference numerals and their description will be omitted.

In the fifth embodiment, the push-pull signal Spp corresponding to the first VFO data 120 in the header portion 10 is added to the push-pull signal Spp corresponding to the first VFO data 120 in the header portion 11 to generate the addition signal Supp, and then the error signal generation circuit 12c extracts the D.C. component to generate the tilt error signal Ste. In contrast, in the seventh embodiment, the amplitude of the addition signal Supp is detected, and the error signal generation circuit 12c generates the tilt error signal Ste based on the amplitude thus detected. As shown in FIG. 17, the servo signal generation circuit 24 of the seventh embodiment includes the delay circuit 12a, the adder 23a and the error signal generation circuit 12c, which have the same functions as those in the fifth embodiment. In addition, the servo signal generation circuit 24 includes the amplitude detection circuit 24a which detects the amplitude of the addition signal Supp (having the completely same waveform as that in the case of the fifth embodiment) corresponding to the radial tilt outputted by the adder 23a, and supplies it to the error signal generation circuit 12c as the amplitude signals Sa. The error signal generation circuit 12c may be the averaging circuit or the low-pass filter like the case of the fifth embodiment, and extracts the D.C. component of the amplitude signals Sa to generate the tilt error signal Ste, and supplies it to the driver 13.

As shown in FIG. 18A, the relation of the level and the polarity of the tilt error signal Ste obtained by extracting the D.C. component of the amplitude signal Sa by means of the error signal generation circuit 12c with respect to the quantity and the direction of the radial tilt is substantially the linear function relation of reverse polarity, as compared with the previous embodiments. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the seventh embodiment, since the amplitude of the addition signal Supp is detected to generate the tilt error signal Ste, the advantageous effect similar to that in the fifth embodiment can be achieved.

[IX] 8th Embodiment of the Information Reproduction Apparatus

Figure 18B:
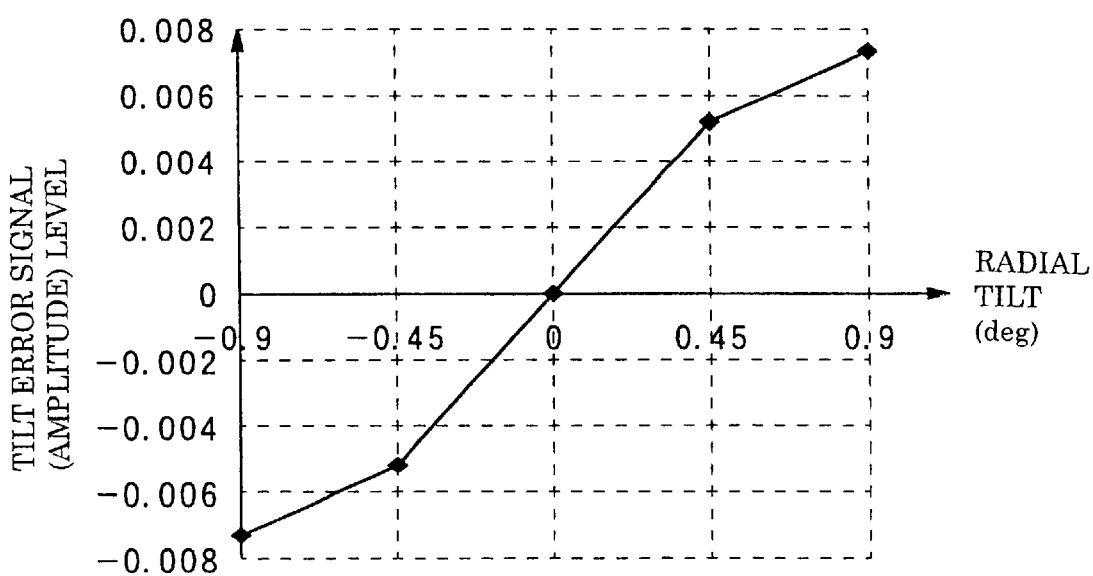
FIG. 18B is a graph showing the relation between the radial tilt and the tilt error signal according to the eighth embodiment.

Next, the eighth embodiment of the information reproduction apparatus according to the present invention will be described with reference to FIG. 18B. FIG. 18B is a graph for explaining the relation of the level and the polarity of the tilt error signal with respect to the quantity and the direction of the radial tilt according to the eighth embodiment. The information reproduction apparatus of the eighth embodiment differs, in configuration, from that of the fifth embodiment only in the configuration of the servo signal generation circuit, and other configuration is the same as that of the fifth embodiment. Therefore, the same components are indicated by the same reference numerals and their description will be omitted.

In the sixth embodiment, the push-pull signal Spp corresponding to the first VFO data 120 in the header portion 11 is subtracted from the push-pull signal Spp corresponding to the first VFO data 120 in the header portion 10 to generate the subtraction signal of the sixth embodiment, those two push-pull signals are added to each other to produce the addition signal of the sixth embodiment, the subtraction signal is multiplied by the addition signal to produce the multiplication signal, and then the error signal generation circuit 12c extracts the D.C. component of the multiplication signal to generate the tilt error signal Ste. In contrast, in the eighth embodiment, the amplitude of the multiplication signal is detected, and the error signal generation circuit 12c generates the tilt error signal Ste based on the change of the amplitude thus detected.

The configuration of the servo signal generation circuit according to the eighth embodiment is obtained by replacing the detection signal Ss inputted in the configuration of the servo signal generation circuit 22 of the fourth embodiment with the push-pull signal Spp, and hence the following description will temporarily refer to the configuration of the circuit 22 shown in FIG. 11. Namely, the servo signal generation circuit of the eighth embodiment includes the delay circuit 12a, the subtracter, the adder, the multiplier, and the error signal generation circuit 12c, which have the same functions as those in the fourth embodiment. In addition, the servo signal generation circuit of the eighth embodiment includes the amplitude detection circuit which detects the amplitude of the multiplication signal of the eighth embodiment (having the completely same waveform as that in the case of the sixth embodiment shown in FIG. 16A) corresponding to the radial tilt and outputted by the multiplier, and supplies it to the error signal generation circuit 12c as the amplitude signals of the eighth embodiment. The error signal generation circuit 12c may be the averaging circuit or the low-pass filter like the case of the sixth embodiment, and extracts the D.C. component of the amplitude signals Sa to generate the tilt error signal Ste, and supplies it to the driver 13.

As shown in FIG. 18B, the relation of the level and the polarity of the tilt error signal Ste obtained by extracting the D.C. component of the respective amplitude signals Sa by means of the error signal generation circuit 12c with respect to the quantity and the direction of the radial tilt is substantially the linear function like the previous embodiments. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the eighth embodiment, the amplitude of the multiplication signal of the eighth embodiment is detected thereby to produce the tilt error signal Ste. Therefore, the advantageous effect similar to the radial tilt compensation operation in the fifth embodiment can be obtained.

[X] 9th Embodiment of Information Reproduction Apparatus

Figure 19:
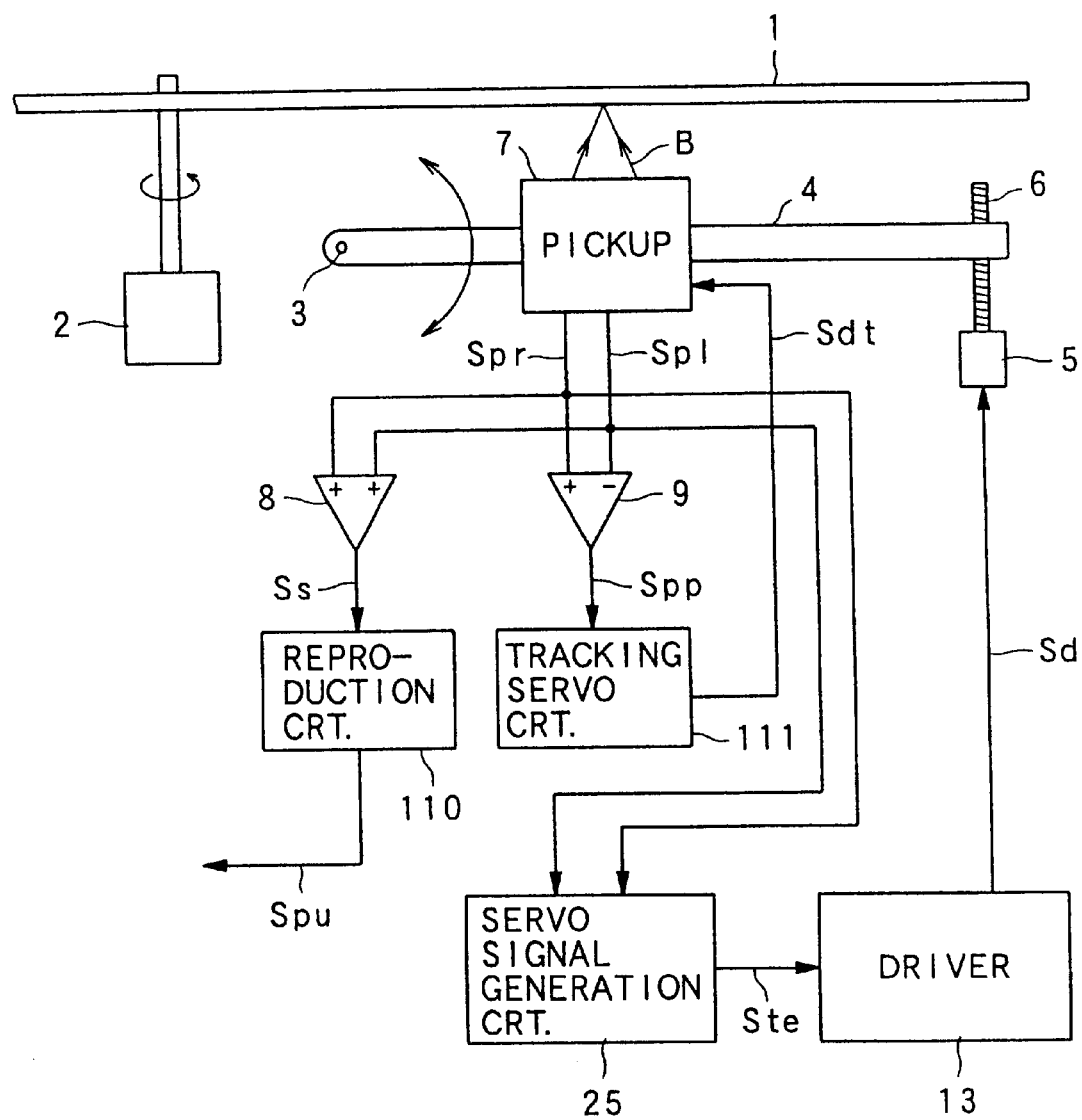
FIG. 19 is a block diagram showing the overall configuration of the information reproduction apparatus according to the ninth embodiment.
Figure 20:
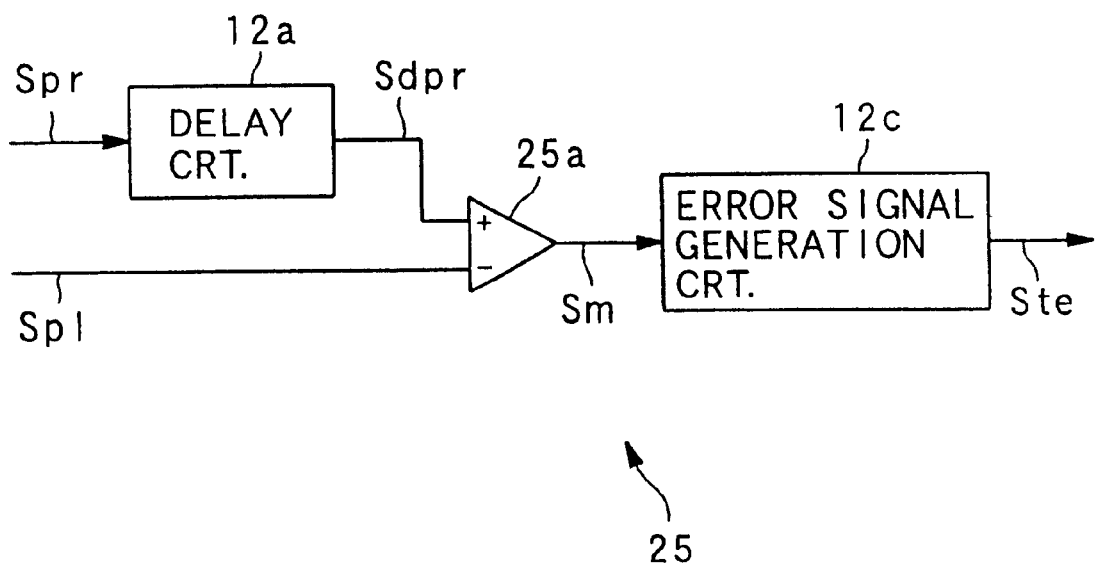
FIG. 20 is a block diagram showing the configuration of the servo signal generation circuit of the ninth embodiment.
Figure 21A:
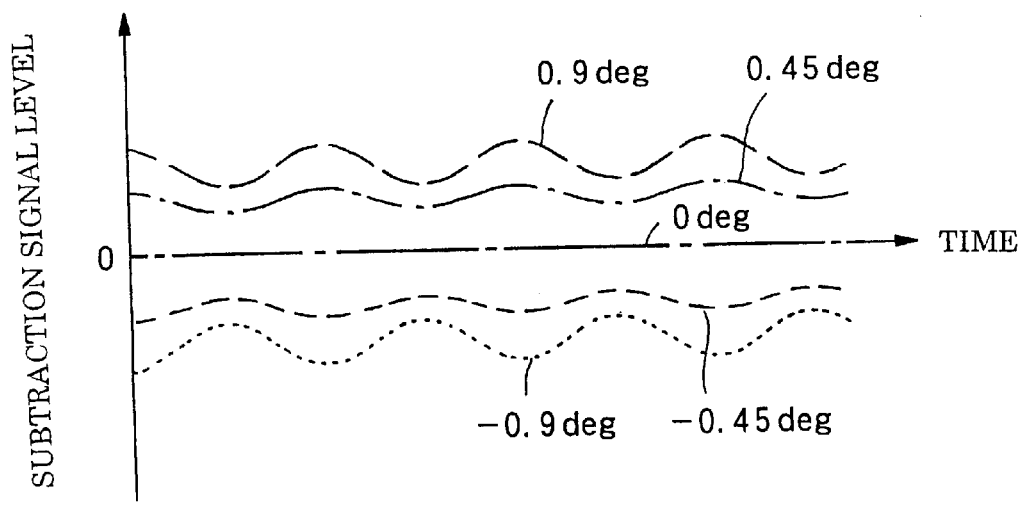
FIG. 21A is a graph showing the waveforms of the subtraction signals according to the ninth embodiment.
Figure 21B:
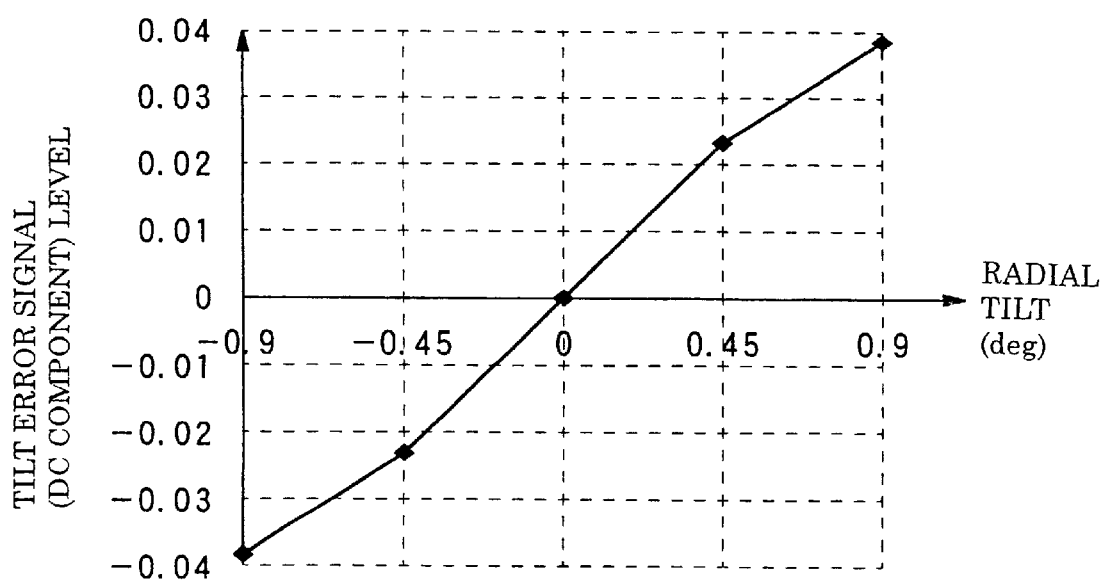
FIG. 21B is a graph showing the relation between the radial tilt and the tilt error signal according to the ninth embodiment.

Next, the ninth embodiment of the information reproduction apparatus according to the present invention will be described with reference to FIGS. 19 to 21. FIG. 19 is a block diagram showing the schematic configuration of the information reproduction apparatus of the ninth embodiment, FIG. 20 is a block diagram showing the configuration of the servo signal generation circuit of the ninth embodiment, and FIGS. 21A and 21B are graphs for explaining the generation of the tilt error signal.

First, the configuration of the information reproduction apparatus of the ninth embodiment will be described. As shown in FIG. 19, the information reproduction apparatus SS9 of the ninth embodiment includes the same components as those of the first embodiment except for the servo signal generation circuit 25. Further, the information reproduction apparatus SS9 is different from the first embodiment in that the received light signals Spr and Spl outputted by the half-detectors 7a and 7b (see. FIG. 5) are directly supplied to the servo signal generation circuit 25. In FIGS. 19 and 20, the same components as those in the information reproduction apparatus SS1 are indicated by the same reference numerals and the detailed description therefor will be omitted.

The half-detectors are arranged as follows. Namely, the half-detector 7a is positioned to receive the reflected light from the first VFO data 120 while the light spot of the light beam B is scanning the first VFO data 120 in the header portion 10, and hence the received light signal Spr includes a lot of information corresponding to the first VFO data 120 in the header portion 10. The half-detector 7b is positioned to receive the reflected light from the first VFO data 120 while the light spot of the light beam B is scanning the first VFO data 120 in the header portion 11, and hence the received light signal Spl includes a lot of information corresponding to the first VFO data 120 in the header portion 11. As shown in FIG. 20, the servo signal generation circuit 25 includes the delay circuit 12a and the error signal generation circuit 12c, which are identical to those in the first embodiment, and the subtracter 25a.

Next, the operation of the servo signal generation circuit 25 according to the ninth embodiment will be described with reference to FIGS. 20, 21A and 21B. As shown in FIG. 20, the servo signal generation circuit 25 detects the radial tilt presently occurring by the later-described processing using the received light signals Spr and Spl, generates the tilt error signal Ste indicating the quantity and the direction of the radial tilt, and supplies it to the driver 13. The received light signal Spl inputted to the servo signal generation circuit 12 is supplied to the negative-input terminal of the subtracter 25. The received light signal Spr corresponds to the first VFO data 120 in the header portion 10 and is supplied to the delay circuit 12a. The delay circuit 12a delays the received light signal Spr thus inputted for the delay time period by which the irradiated range of the light beam B on the DVD-RAM 1 passes through the region of the header portion 10 shown in FIG. 3 according to the same delaying operation as that of the first embodiment, and supplies it to the positive-input terminal of the subtracter 25a as the delay signal Sdpr. By this, the received light signals Spr corresponding to the first VFO data 120 in the header portion 10 and the received light signal Spl corresponding to the first VFO data 120 in the header portion 11 are simultaneously supplied to the subtracter 25a, respectively. The method of detecting the received light signal Spr corresponding to the first VFO data 120 in the header portion 10 from the inputted received light signal Spr may be the same as the method employed in the first embodiment for the detection signal Ss. The subtracter 25a subtracts the received light signal Spl corresponding to the first VFO data 120 in the header portion 11 from the delay signal Sdpr (i.e., the received light signal corresponding to the first VFO data 120 in the header 10) to generate the subtraction signal Sm, and supplies it to the error signal generation circuit 12c.

The actual waveform of the subtraction signal Sm will be described with reference to FIG. 21A. It is noted that FIG. 21A shows the waveforms of the subtraction signal Sm when the radial tilt is 0.9 deg., 0.45 deg., 0 deg., –0.45 deg., –0.9 deg., respectively, like the cases of the previous embodiments. In addition, one period in each waveform corresponds to 8×T.

As seen in FIG. 21A, when the quantity and the direction of the radial tilt occurring in relation with the DVD-RAM 1 change, the level and the waveform of the subtraction signal Sm changes, and the tendency or characteristic of the change is the same as that of the subtraction signal Sm in the first embodiment. The reason why the subtraction signal Sm changes as shown in FIG. 21A when the quantity and the direction of the radial tilt changes is identical to the case of the first embodiment.

As shown in FIG. 21B, the relation of the level and the polarity of the tilt error signal Ste obtained by extracting the D.C. component of the subtraction signal Sm by means of the error signal generation circuit 12c with respect to the quantity and the direction of the radial tilt is substantially the linear function like the case of the first embodiment. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus SS9 of the ninth embodiment, the advantageous effect similar to that in the first embodiment can be achieved.

[XI] 10th Embodiment of Information Reproduction Apparatus

Figure 22:
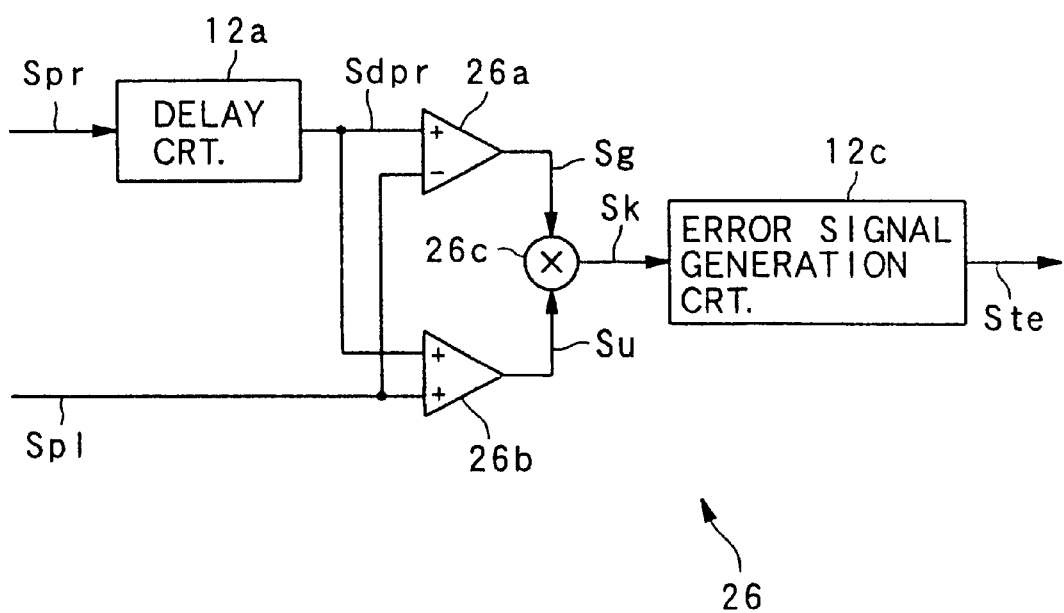
FIG. 22 is a block diagram showing the configuration the servo signal generation circuit of the tenth embodiment.
Figure 23A:
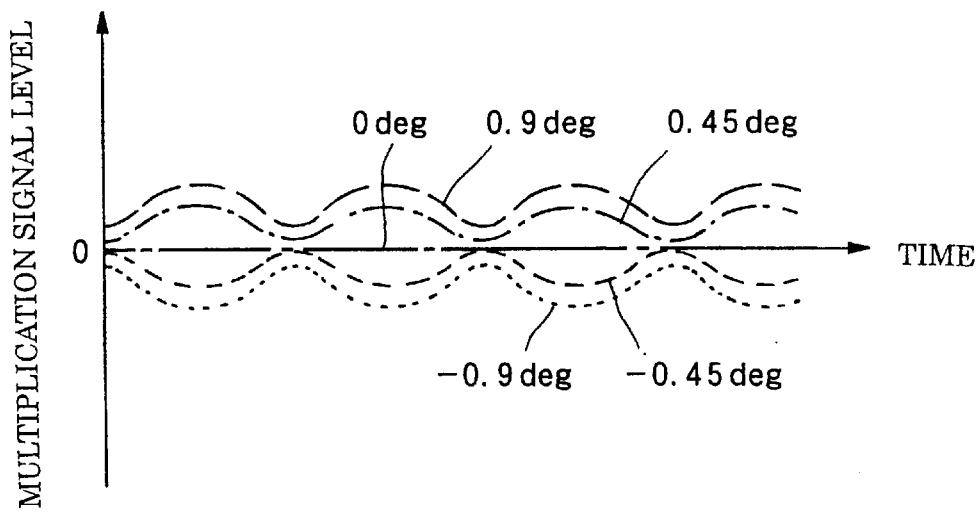
FIG. 23A is a graph showing the waveforms of the multiplication signals according to the tenth embodiment.
Figure 23B:
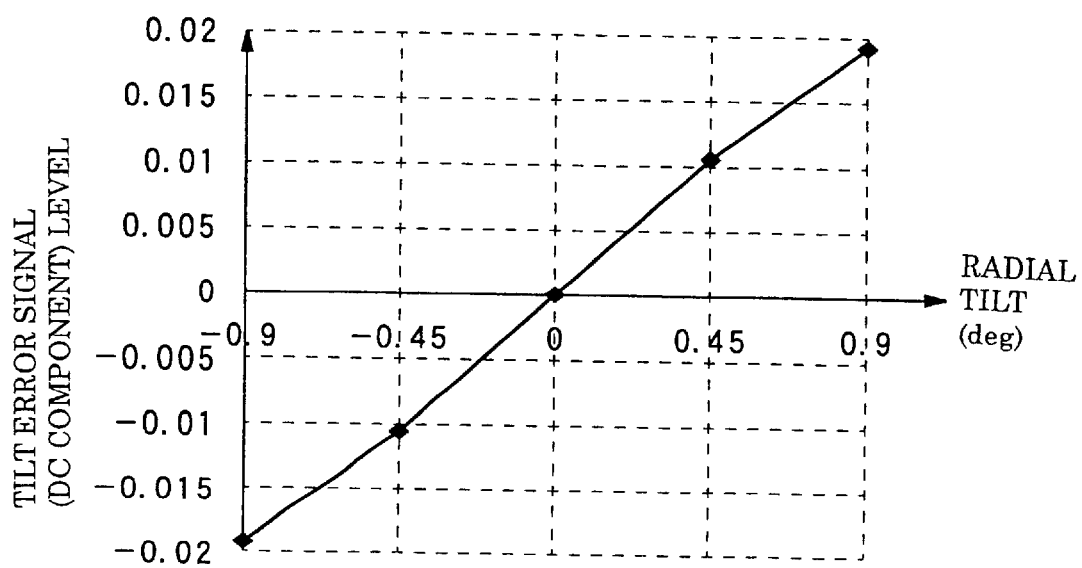
FIG. 23B is a graph showing the relation between the radial tilt and the tilt error signal according to the tenth embodiment.

Next, the tenth embodiment of the information reproduction apparatus will be described with reference to FIGS. 22, 23A and 23B. FIG. 22 is a block diagram showing the configuration of the servo signal generation circuit of the tenth embodiment, and FIGS. 23A and 23B are graphs for explaining the generation of the tilt error signal according to the tenth embodiment. The information reproduction apparatus of the tenth embodiment differs, in configuration, from that of the ninth embodiment only in the configuration of the servo signal generation circuit, and other configuration is the same as that of the ninth embodiment. Therefore, the same components are indicated by the same reference numerals and their description will be omitted.

In the ninth embodiment, the received light signal Spl corresponding to the first VFO data 120 in the header portion 11 is subtracted from the received light signal Spr corresponding to the first VFO data 120 in the header portion 10 to generate the subtraction signal Sm, and then the error signal generation circuit 12c generates the tilt error signal Ste based on the subtraction signal Sm. In contrast, in the tenth embodiment, other operation is applied to the received light signal Spr corresponding to the first VFO data 120 in the header portion 10 and the received light signal Spl corresponding to the first VFO data 120 in the header portion 11, and the tilt error signal Ste is generated based on the operation result. Namely, as shown in FIG. 22, the servo signal generation circuit 26 of the tenth embodiment includes the delay circuit 12a and the error signal generation circuit 12c, which have the same functions as those in the first embodiment, the subtracter 26a, the adder 26b, and the multiplier 26c. The subtracter 26a subtracts the received light signal Spl from the delay signal Sdpr outputted by the delay circuit 12a to generate the subtraction signal Sg, and supplies it to the multiplier 26c. The adder 26b adds the delay signal Sdpr to the received light signal Spl to generate the addition signal Su, and supplies it to the multiplier 26c. The multiplier 26c multiplies the subtraction signal Sg by the addition signal Su to generate the multiplication signal Sk, and supplies it to the error signal generation circuit 12c. The error signal generation circuit 12c may be the averaging circuit or the low-pass filter like the case of the ninth embodiment, and extracts the D.C. component of the multiplication signal Sk to generate the tilt error signal Ste, and supplies it to the driver 13.

Next, the actual waveform of the multiplication signal Sk will be described with reference to FIG. 23A. FIG. 23A shows the waveforms of the multiplication signal Sk generated when the radial tilt is 0.9 deg., 0.45 deg., 0 deg., −0.45 deg., −0.9 deg., respectively, similarly the case of the ninth embodiment, and one period of the respective multiplication signal Sk corresponds to 8×T. As seen in FIG. 23A, when the quantity and the direction of the radial tilt occurring in relation with the DVD-RAM 1 change, the level and the waveform of the multiplication signal Sk change, similarly to the subtraction signal Sm of the ninth embodiment, and the tendency or characteristic of the change is the same as that of the subtraction signal Sm in the ninth embodiment. The reason why the multiplication signal Sk changes as shown in FIG. 23A when the quantity and the direction of the radial tilt change is identical to the case of the subtraction signal Sm in the ninth embodiment.

As shown in FIG. 23B, the relation of the level and the polarity of the tilt error signal Ste obtained by extracting the D.C. component of the respective multiplication signals Sk by means of the error signal generation circuit 12c with respect to the quantity and the direction of the radial tilt is substantially the linear function like the case of the ninth embodiment. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the tenth embodiment, the advantageous effect similar to that in the ninth embodiment can be achieved.

[XII] 11th Embodiment of Information Reproduction Apparatus

Figure 24:
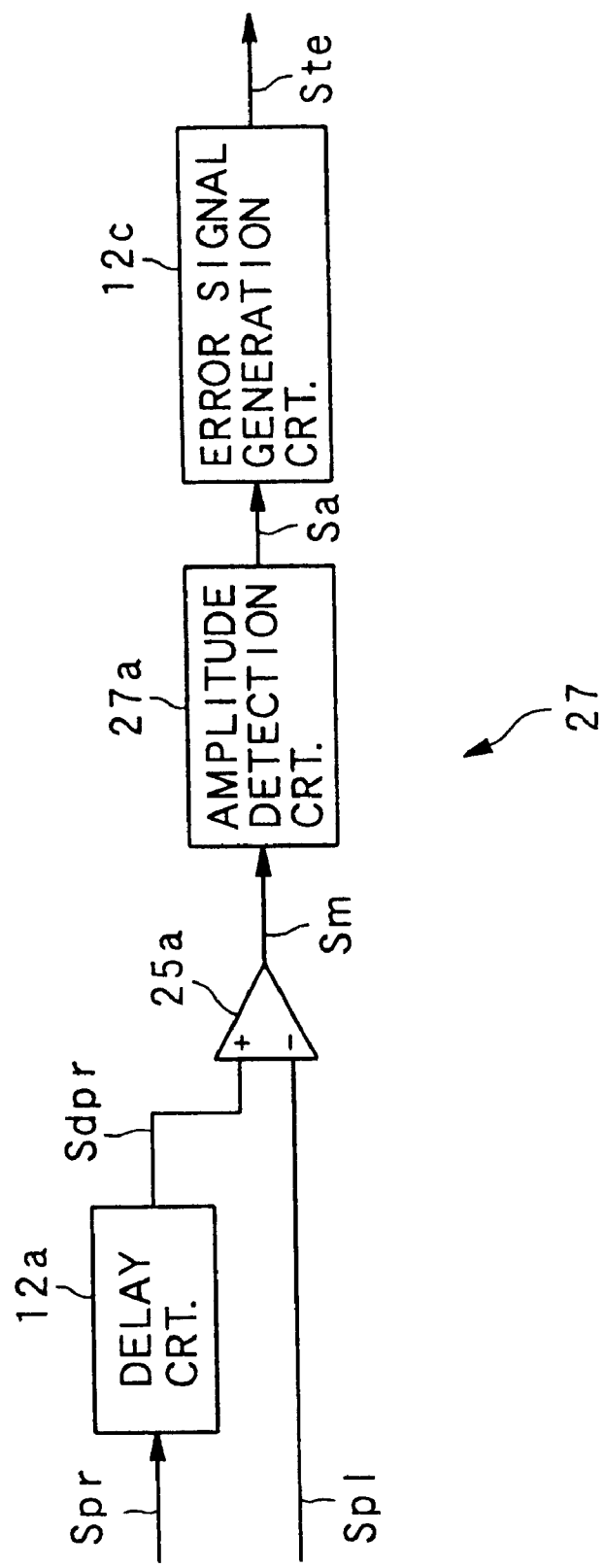
FIG. 24 is a block diagram showing the configuration of the servo signal generation circuit of the eleventh embodiment.

Next, the eleventh embodiment of the information reproduction apparatus according to the present invention will be described with reference to FIGS. 24 and 26A. FIG. 24 is a block diagram showing the configuration of the servo signal generation circuit according to the eleventh embodiment, and FIG. 26B is a graph showing the relation of the level and the polarity of the tilt error signal with respect to the quantity and the direction of the radial tilt. The information reproduction apparatus of the eleventh embodiment differs, in configuration, from that of the ninth embodiment only in the configuration of the servo signal generation circuit, and other configuration is the same as that of the ninth embodiment. Therefore, the same components are indicated by the same reference numerals and their description will be omitted.

In the ninth embodiment, the received light signal Spl corresponding to the first VFO data 120 in the header portion 11 is subtracted from the received light signal Spr corresponding to the first VFO data 120 in the header portion 10 to generate the subtraction signal Sm, and then the error signal generation circuit 12c generates the tilt error signal Ste extracts the D.C. component to generate the subtraction signal Sm. In contrast, in the eleventh embodiment, the amplitude of the subtraction signal Sm is detected, and the error signal generation circuit 12c generates the tilt error signal Ste based on the change of the amplitude thus detected. Namely, as shown in FIG. 24, the servo signal generation circuit 27 according to the eleventh embodiment includes the delay circuit 12a, subtracter 25a and the error signal generation circuit 12c, which have the same functions as those in the ninth embodiment, and the amplitude detection circuit 27a. The amplitude detection circuit 27a detects the amplitude of the subtraction signal Sm (having completely the same waveform as in the case of ninth embodiment shown in FIG. 21A) corresponding to the radial tilt and outputted by the subtracter 25a, and supplies the detected amplitude to the error signal generation circuit 12c as the amplitude signal Sa. The error signal generation circuit 12c may be the averaging circuit or the low-pass filter like the case of the ninth embodiment, and extracts the D.C. component of the amplitude signal Sa to generate the tilt error signal Ste, and supplies it to the driver 13.

Figure 26A:
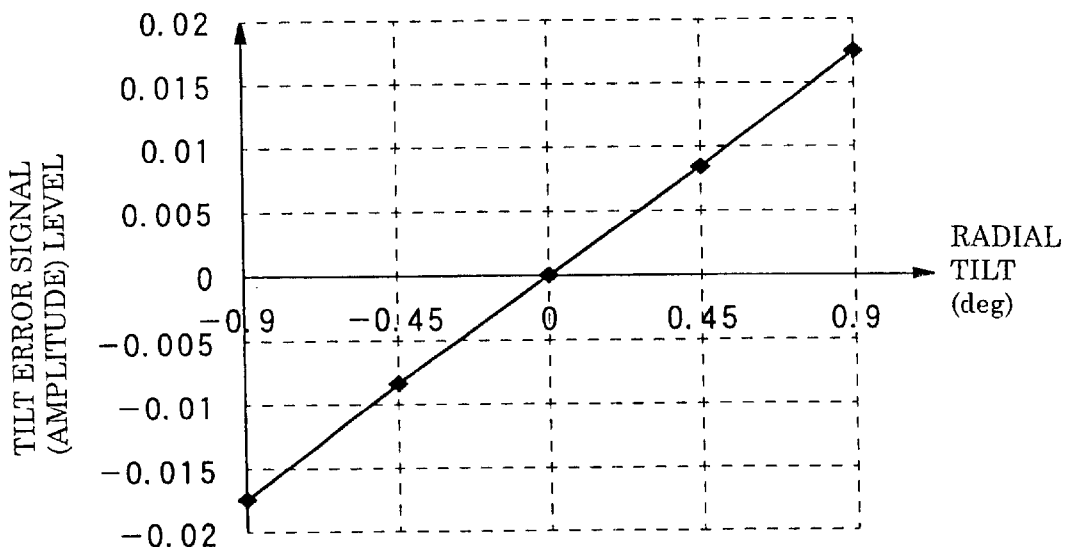
FIG. 26A is a graph showing the relation between the radial tilt and the tilt error signal according to the eleventh embodiment.
Figure 26B:
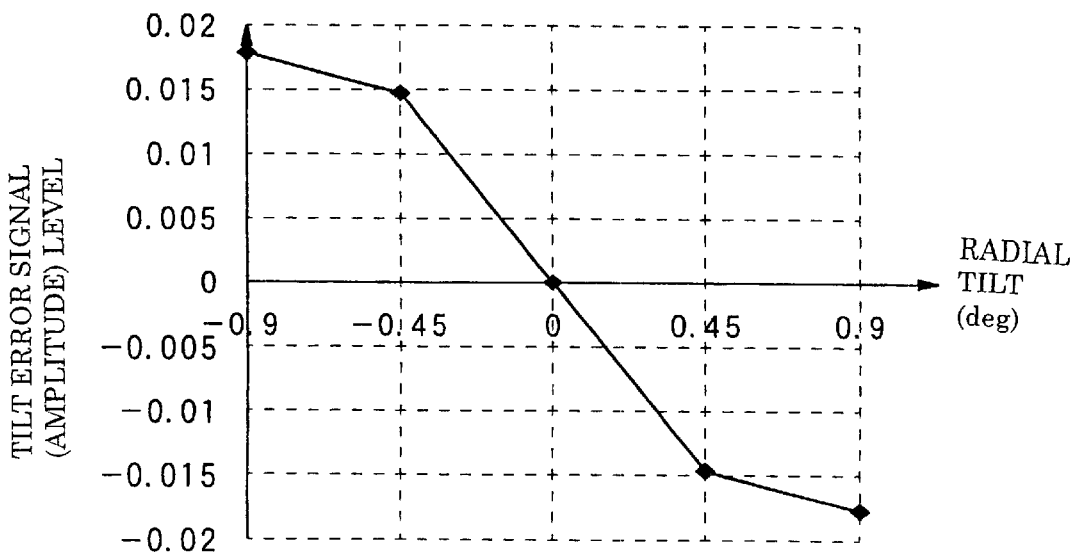
FIG. 26B is a graph showing the relation between the radial tilt and the tilt error signal according to the twelfth embodiment.

As shown in FIG. 26A, the relation of the level and the polarity of the tilt error signal Ste obtained by extracting the D.C. component of the amplitude signal Sa by means of the error signal generation circuit 12c with respect to the quantity and the direction of the radial tilt is substantially the linear function like the cases of the previous embodiments. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the eleventh embodiment, since the amplitude of the subtraction signal Sm is detected to generate the tilt error signal Ste indicative of the radial tilt, the advantageous effect similar to that in the ninth embodiment can be achieved.

[XIII] 12th Embodiment of Information Reproduction Apparatus

Figure 25:
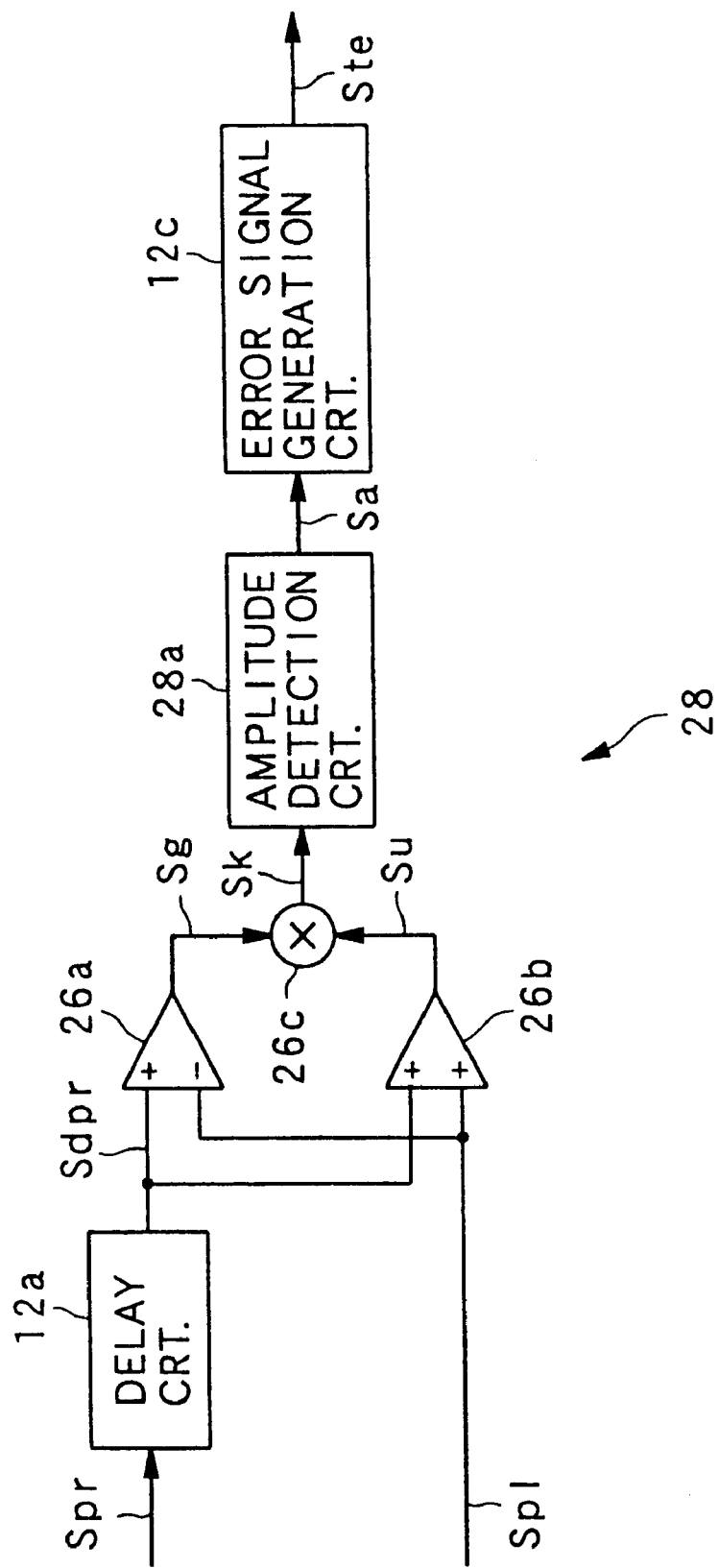
FIG. 25 is a block diagram showing the configuration of the servo signal generation circuit of the twelfth embodiment.

Next, the twelfth embodiment of the information reproduction apparatus according to the present invention will be described with reference to FIGS. 25 and 26B. FIG. 25 is a block diagram showing the configuration of the servo signal generation circuit according to the twelfth embodiment, and FIG. 26B is a graph showing the relation of the level and the polarity of the tilt error signal with respect to the quantity and the direction of the radial tilt. The information reproduction apparatus of the twelfth embodiment differs, in configuration, from that of the ninth embodiment only in the configuration of the servo signal generation circuit, and other configuration is the same as that of the ninth embodiment. Therefore, the same components are indicated by the same reference numerals and their description will be omitted.

In the tenth embodiment, the received light signal Spl corresponding to the first VFO data 120 in the header portion 11 is subtracted from the received light signal Spr corresponding to the first VFO data 120 in the header portion 10 to generate the subtraction signal Sg. The received light signal Spr and the received light signal Spl are added to each other to produce the addition signal Su, the subtraction signal Sg is multiplied by the addition signal Su to produce the multiplication signal Sk, and then the error signal generation circuit 12c extracts the D.C. component of multiplication signal Sk to generate the tilt error signal Ste. In contrast, in the twelfth embodiment, the amplitude of the multiplication signal Sk is detected, and the error signal generation circuit 12c generates the tilt error signal Ste based on the change of the amplitude thus detected. Namely, as shown in FIG. 25, the servo signal generation circuit 28 according to the twelfth embodiment includes the delay circuit 12a, subtracter 26a, the adder 26b, the multiplier 26c, and the error signal generation circuit 12c, which have the same functions as those in the tenth embodiment, and the amplitude detection circuit 28a. The amplitude detection circuit 28a detects the amplitude of the multiplication signal Sk (having completely the same waveform as in the case of tenth embodiment shown in FIG. 23A) corresponding to the radial tilt outputted by the multiplier 26c, and supplies the detected amplitude to the error signal generation circuit 12c as the amplitude signal Sa. Like the case of the tenth embodiment, the error signal generation circuit 12c extracts the D.C. component of the amplitude signal Sa to generate the tilt error signal Ste, and supplies it to the driver 13.

As shown in FIG. 26B, the relation of the level and the polarity of the tilt error signal Ste obtained by extracting the D.C. component of the respective amplitude signals Sa by means of the error signal generation circuit 12c with respect to the quantity and the direction of the radial tilt is substantially the linear function of the reverse polarity, as compared with the cases of the previous embodiments. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the twelfth embodiment, since the amplitude of the multiplication signal Sk is detected to generate the tilt error signal Ste indicative of the radial tilt, the advantageous effect similar to that in the ninth embodiment can be achieved.

[XIV] 13th Embodiment of Information Reproduction Apparatus

Figure 27:
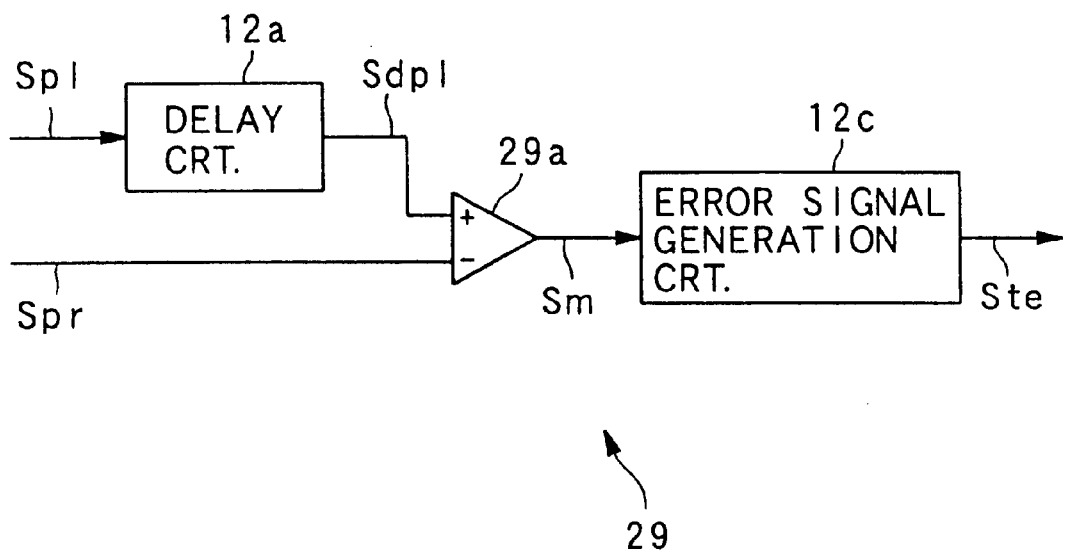
FIG. 27 is a block diagram showing the configuration of the servo signal generation circuit of the thirteenth embodiment.
Figure 28A:
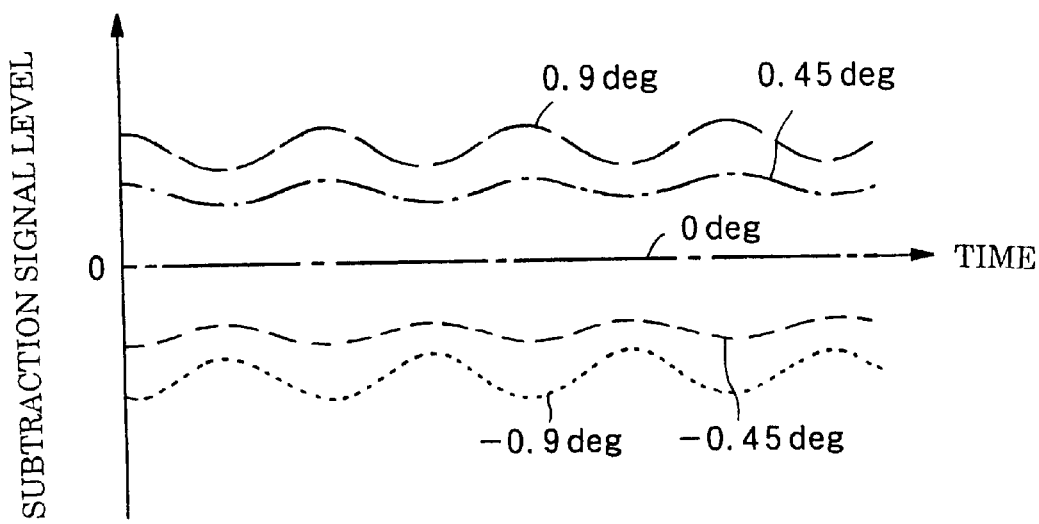
FIG. 28A is a graph showing the waveforms of the subtraction signals according to the thirteenth embodiment.
Figure 28B:
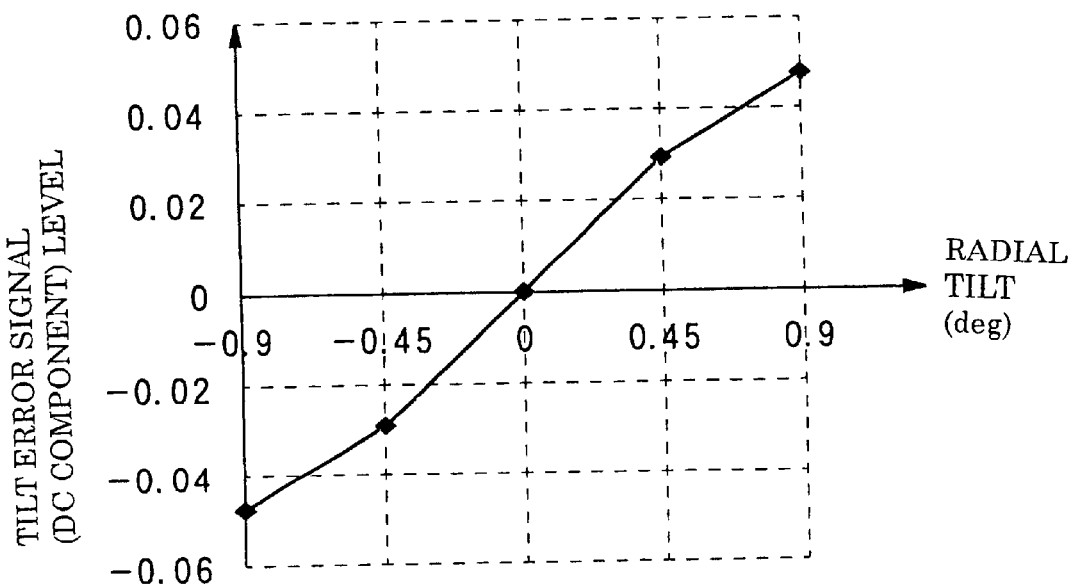
FIG. 28B is a graph showing the relation between the radial tilt and the tilt error signal according to the thirteenth embodiment.

Next, the thirteenth embodiment of the information reproduction apparatus according to the present invention will be described with reference to FIGS. 27, 28A and 28B. FIG. 27 is a block diagram showing the schematic configuration of the information reproduction apparatus of the thirteenth embodiment, and FIGS. 28A and 28B are graphs for explaining the generation of the tilt error signal.

First, the configuration of the information reproduction apparatus of the thirteenth embodiment will be described. The information reproduction apparatus of the thirteenth embodiment includes the same components as those of the ninth embodiment shown in FIG. 19, except for the servo signal generation circuit. Therefore, the same components as those in the information reproduction apparatus SS9 are indicated by the same reference numerals and the detailed description therefor will be omitted.

In the information reproduction apparatus SS9 of the ninth embodiment, the half-detectors constituting the detector D of the pickup 7 are arranged as follows. Namely, the half-detector 7a is positioned to receive the reflected light from the first VFO data 120 while the light spot of the light beam B is scanning the first VFO data 120 in the header portion 10. The half-detector 7b is positioned to receive the reflected light from the first VFO data 120 while the light spot of the light beam B is scanning the first VFO data 120 in the header portion 11. Then, the received light signal Spr corresponding to the first VFO data 120 in the header 10 and the received light signal Spl corresponding to the first VFO data 120 in the header 11 are used to generate the tilt error signal Ste. In the following thirteenth to sixteenth embodiment, the positions of the half-detectors 7a and 7b are maintained unchanged. However, the received light signal Spl corresponding to the first VFO data 120 in the header portion 10 and the received light signal Spr corresponding to the first VFO data 120 in the header portion 11 (i.e., the received light signal Spl including less information corresponding to the first VFO data 120 in the header portion 10 and the received light signal Spr including less information corresponding to the first VFO data 120 in the header portion 11) are used to generate the tilt error signal Ste. Namely, as shown in FIG. 27, the servo signal generation circuit 29 according to the thirteenth embodiment includes the delay circuit 12a and the error signal generation circuit 12c, which are the same as those in the ninth embodiment, and the subtracter 29a. However, the received light signal Spl inputted to the servo signal generation circuit 29 is supplied to the delay circuit 12a, and the received light signal Spr is supplied to the negative-input terminal of the subtracter 29a.

Next, the operation of the servo signal generation circuit according to the thirteenth embodiment will be described with reference to FIGS. 27, 28A and 28B. As shown in FIG. 27, the servo signal generation circuit 29 detects the radial tilt presently occurring by the later-described processing using the received light signals Spr and Spl, generates the tilt error signal Ste indicating the quantity and the direction of the radial tilt, and supplies it to the driver 13. The received light signal Spr inputted to the servo signal generation circuit 12 is supplied to the negative-input terminal of the subtracter 29a. The received light signal Spl is supplied to the delay circuit 12a. The delay circuit 12a delays the received light signal Spl thus inputted (i.e., the received light signal Spl corresponding to the first VFO data 120 in the header portion 10) for the delay time period by which the irradiated range of the light beam B on the DVD-RAM 1 passes through the region of the header portion 10 shown in FIG. 3 according to the same delaying operation as that of the ninth embodiment, and supplies it to the positive-input terminal of the subtracter 29a as the delay signal Sdpl. By this, the received light signals Spl corresponding to the first VFO data 120 in the header portion 10 and the received light signal Spr corresponding to the first VFO data 120 in the header portion 11 are simultaneously supplied to the subtracter 29a, respectively. The method of detecting the received light signal Spl corresponding to the first VFO data 120 in the header portion 10 from the inputted received light signal Spl may be the same as the method employed in the first embodiment for the detection signal Ss. The subtracter 29a subtracts the received light signal Spr corresponding to the first VFO data 120 in the header portion 11 from the delay signal Sdpl (i.e., the received light signal Spl corresponding to the first VFO data 120 in the header 10) to generate the subtraction signal Sm, and supplies it to the error signal generation circuit 12c.

The actual waveform of the subtraction signal Sm will be described with reference to FIG. 28A. It is noted that FIG. 28A shows the waveforms of the subtraction signal Sm when the radial tilt is 0.9 deg., 0.45 deg., 0 deg., −0.45 deg., −0.9 deg., respectively, like the cases of the previous embodiments. In addition, one period in each waveform corresponds to 8×T.

As seen in FIG. 28A, when the quantity and the direction of the radial tilt occurring in relation with the DVD-RAM 1 change, the level and the waveform of the subtraction signal Sm change, and the tendency or characteristic of the change is the same as that of the subtraction signal Sm in the ninth embodiment. The reason why the subtraction signal Sm changes as shown in FIG. 28A when the quantity and the direction of the radial tilt changes is identical to the case of the subtraction signal Sm in the ninth embodiment. As shown in FIG. 28B, the relation of the level and the polarity of the tilt error signal Ste obtained by extracting the D.C. component of the subtraction signal Sm by means of the error signal generation circuit 12c with respect to the quantity and the direction of the radial tilt is substantially the linear function like the cases of the previous embodiments. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the thirteenth embodiment, the advantageous effect similar to that in the ninth embodiment can be achieved.

[XI] 14th Embodiment of Information Reproduction Apparatus

Figure 29:
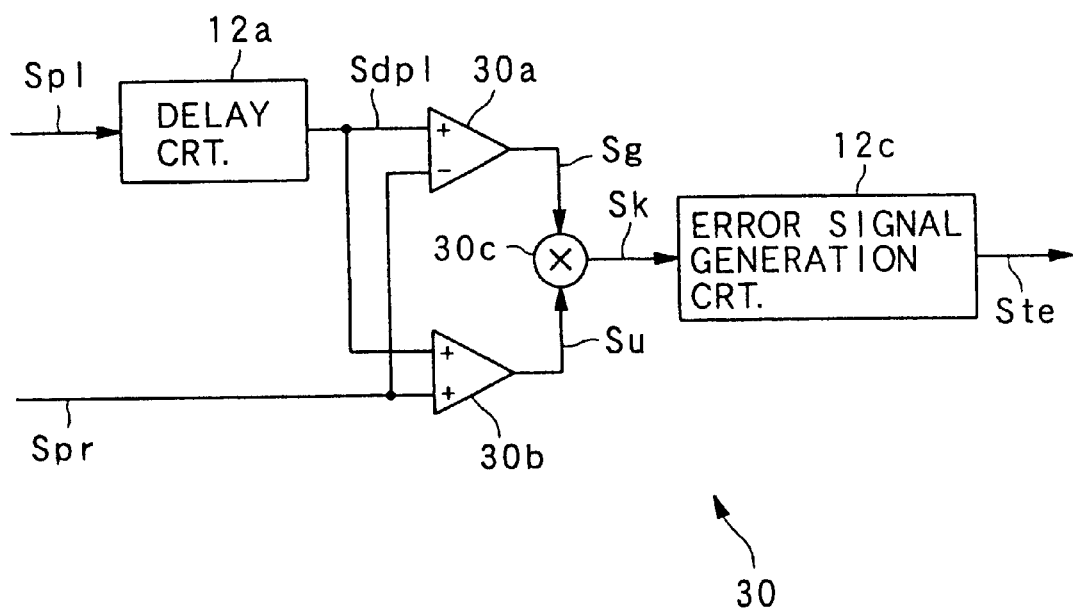
FIG. 29 is a block diagram showing the configuration of the servo signal generation circuit of the fourteenth embodiment.
Figure 30A:
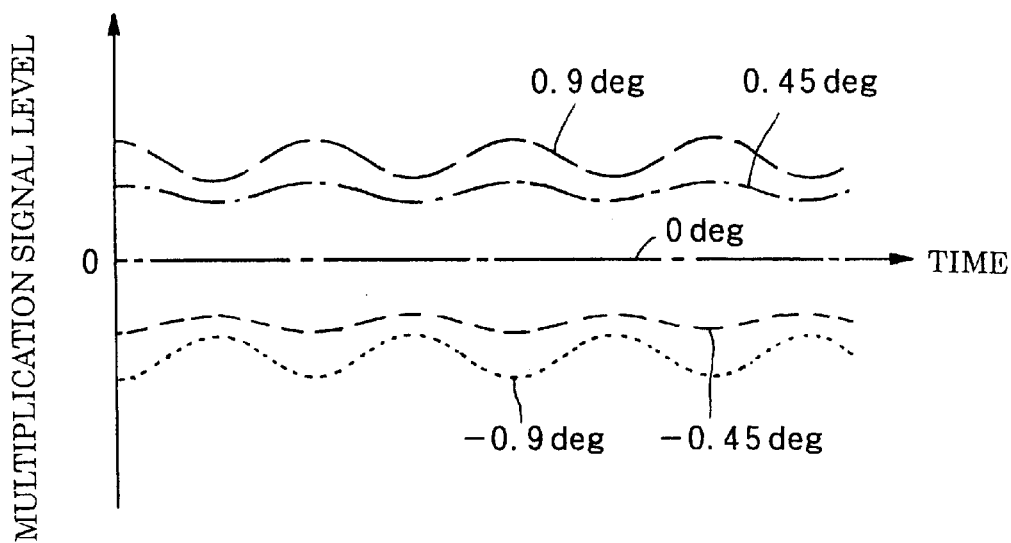
FIG. 30A is a graph showing the waveforms of the multiplication signals according to the fourteenth embodiment.
Figure 30B:
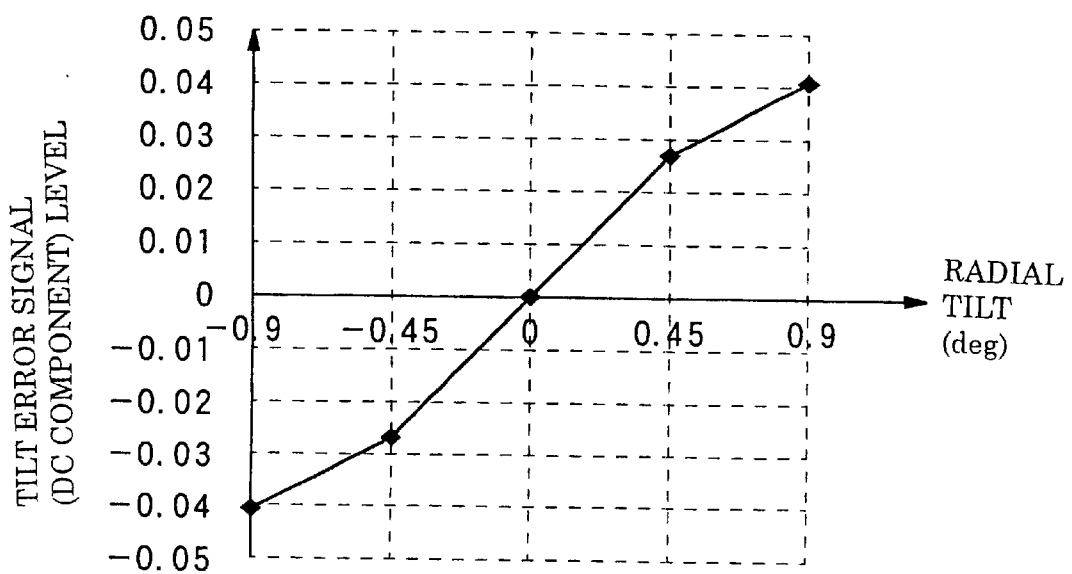
FIG. 30B is a graph showing the relation between the radial tilt and the tilt error signal according to the fourteenth embodiment.

Next, the fourteenth embodiment of the information reproduction apparatus will be described with reference to FIGS. 29, 30A and 30B. FIG. 29 is a block diagram showing the configuration of the servo signal generation circuit of the fourteenth embodiment, and FIGS. 30A and 30B show graphs for explaining the generation of the tilt error signal according to the fourteenth embodiment. The information reproduction apparatus of the fourteenth embodiment differs, in configuration, from that of the thirteenth embodiment only in the configuration of the servo signal generation circuit, and other configuration is the same as that of the thirteenth embodiment. Therefore, the same components are indicated by the same reference numerals and their description will be omitted.

In the thirteenth embodiment, the received light signal Spr corresponding to the first VFO data 120 in the header portion 11 is subtracted from the received light signal Spl corresponding to the first VFO data 120 in the header portion 10 to generate the subtraction signal Sm, and then the error signal generation circuit 12c generates the tilt error signal Ste based on the subtraction signal Sm. In contrast, in the fourteenth embodiment, other operation is applied to the received light signal Spl corresponding to the first VFO data 120 in the header portion 10 and the received light signal Spr corresponding to the first VFO data 120 in the header portion 11, and the tilt error signal Ste is generated based on the operation result. Namely, as shown in FIG. 29, the servo signal generation circuit 30 of the fourteenth embodiment includes the delay circuit 12a and the error signal generation circuit 12c, which have the same functions as those in the thirteenth embodiment, the subtracter 30a, the adder 30b, and the multiplier 30c. The subtracter 30a subtracts the non-delayed received light signal Spr from the delay signal Sdpl outputted by the delay circuit 12a to generate the subtraction signal Sg, and supplies it to the multiplier 30c. The adder 30b adds the delay signal Sdpl to the received light signal Spr to generate the addition signal Su, and supplies it to the multiplier 30c. The multiplier 30c multiplies the subtraction signal Sg by the addition signal Su to generate the multiplication signal Sk, and supplies it to the error signal generation circuit 12c. The error signal generation circuit 12c may be the averaging circuit or the low-pass filter like the case of the thirteenth embodiment, and extracts the D.C. component of the multiplication signal Sk to generate the tilt error signal Ste, and supplies it to the driver 13.

Next, the actual waveform of the multiplication signal Sk will be described with reference to FIG. 30A. FIG. 30A show the waveforms of the multiplication signal Sk generated when the radial tilt is 0.9 deg., 0.45 deg., 0 deg., −0.45 deg., −0.9 deg., respectively, similarly the case of the previous embodiments, and one period of the multiplication signal Sk corresponds to 8×T. As seen in FIG. 30A, when the quantity and the direction of the radial tilt occurring in relation with the DVD-RAM 1 change, the level and the waveform of the multiplication signal Sk change, similarly to the subtraction signal Sm of the thirteenth embodiment, and the tendency or characteristic of the change is the same as that of the subtraction signal Sm in the thirteenth embodiment. The reason why the multiplication signal Sk changes as shown in FIG. 30A when the quantity and the direction of the radial tilt change is identical to the case of the subtraction signal Sm in the thirteenth embodiment.

As shown in FIG. 30B, the relation of the level and the polarity of the tilt error signal Ste obtained by extracting the D.C. component of the multiplication signal Sk by means of the error signal generation circuit 12c with respect to the quantity and the direction of the radial tilt is substantially the linear function like the case of the thirteenth embodiment. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the fourteenth embodiment, the advantageous effect similar to that in the thirteenth embodiment can be achieved.

[XVI] 15th Embodiment of Information Reproduction Apparatus

Figure 31:
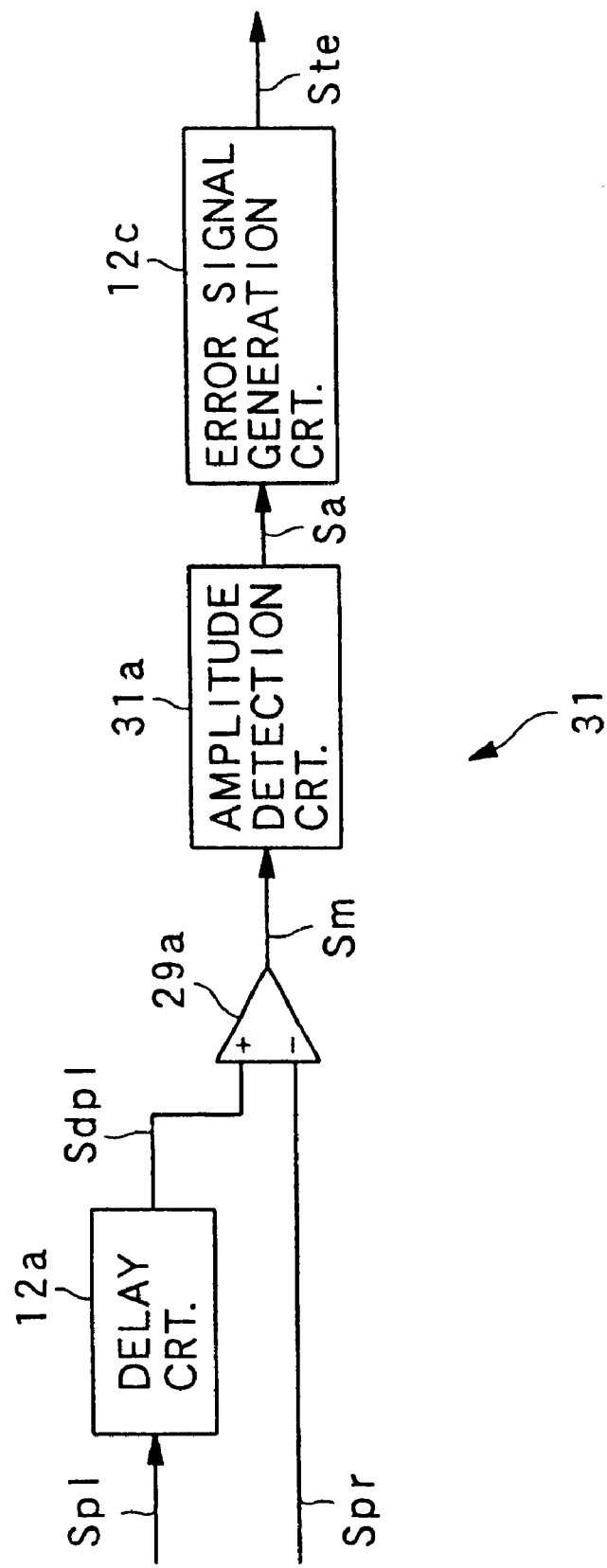
FIG. 31 is a block diagram showing the configuration of the servo signal generation circuit of the fifteenth embodiment.
Figure 33A:
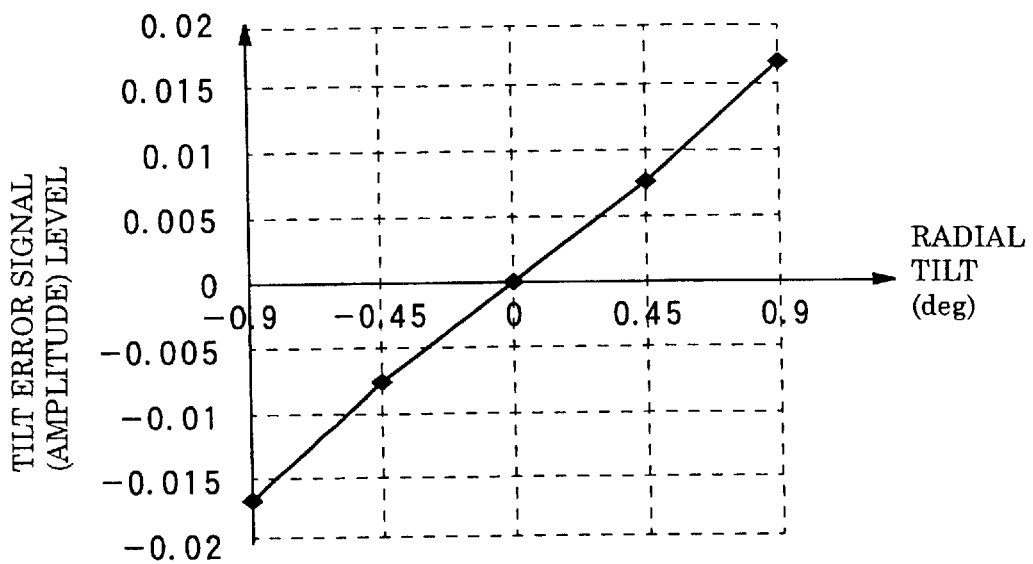
FIG. 33A is a graph showing the relation between the radial tilt and the tilt error signal according to the fifteenth embodiment.

Next, the fifteenth embodiment of the information reproduction apparatus according to the present invention will be described with reference to FIGS. 31 and 33A. FIG. 31 is a block diagram showing the configuration of the servo signal generation circuit according to the fifteenth embodiment, and FIG. 33A is a graph showing the relation of the level and the polarity of the tilt error signal with respect to the quantity and the direction of the radial tilt according to the fifteenth embodiment. The information reproduction apparatus of the fifteenth embodiment differs, in configuration, from that of the thirteenth embodiment only in the configuration of the servo signal generation circuit, and other configuration is the same as that of the thirteenth embodiment. Therefore, the same components are indicated by the same reference numerals and their description will be omitted.

In the thirteenth embodiment, the received light signal Spr corresponding to the first VFO data 120 in the header portion 11 is subtracted from the received light signal Spl corresponding to the first VFO data 120 in the header portion 10 to generate the subtraction signal Sm, and then the error signal generation circuit 12c extracts the D.C. component of the subtraction signal Sm to generate the tilt error signal Ste. In contrast, in the fifteenth embodiment, the amplitude of the subtraction signal Sm is detected, and the error signal generation circuit 12c generates the tilt error signal Ste based on-the change of the amplitude thus detected. Namely, as shown in FIG. 31, the servo signal generation circuit 31 according to the fifteenth embodiment includes the delay circuit 12a, subtracter 29a and the error signal generation circuit 12c, which have the same functions as those in the thirteenth embodiment, and the amplitude detection circuit 31a. The amplitude detection circuit 31a detects the amplitude of the subtraction signal Sm (having completely the same waveform as in the case of thirteenth embodiment shown in FIG. 28A) corresponding to the radial tilt and outputted by the subtracter 29a, and supplies the detected amplitude to the error signal generation circuit 12c as the amplitude signal Sa. The error signal generation circuit 12c may be the averaging circuit or the low-pass filter like the case of the thirteenth embodiment, and extracts the D.C. component of the amplitude signal Sa to generate the tilt error signal Ste, and supplies it to the driver 13.

As shown in FIG. 33A, the relation of the level and the polarity of the tilt error signal Ste obtained by extracting the D.C. component of the respective amplitude signals Sa by means of the error signal generation circuit 12c with respect to the quantity and the direction of the radial tilt is substantially the linear function like the cases of the previous embodiments. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the fifteenth embodiment, since the amplitude of the subtraction signal Sm is detected to generate the tilt error signal Ste indicative of the radial tilt, the advantageous effect similar to that in the thirteenth embodiment can be achieved.

[XVII] 16th Embodiment of Information Reproduction Apparatus

Figure 32:
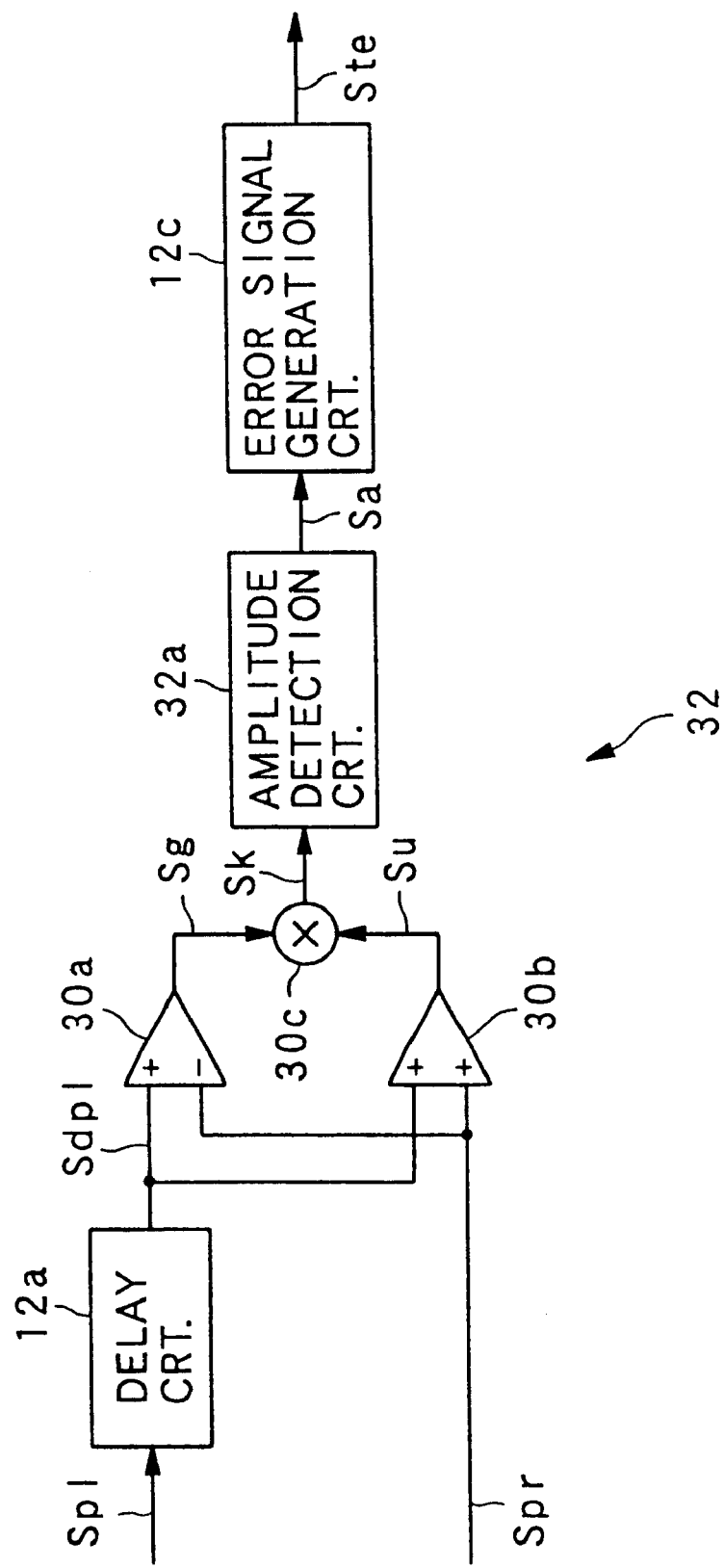
FIG. 32 is a block diagram showing the configuration of the servo signal generation circuit of the sixteenth embodiment.
Figure 33B:
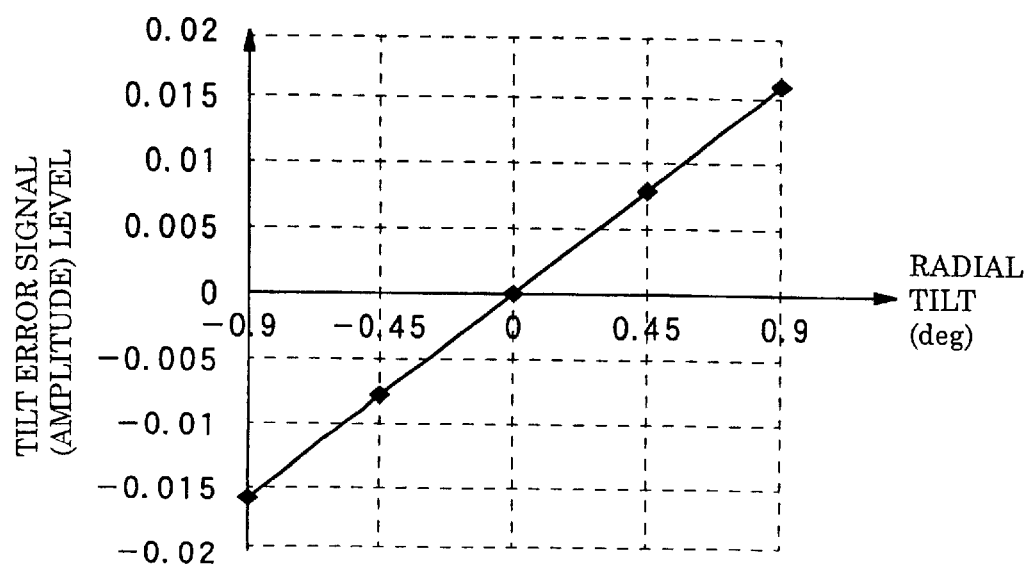
FIG. 33B is a graph showing the relation between the radial tilt and the tilt error signal according to the sixteenth embodiment.

Next, the sixteenth embodiment of the information reproduction apparatus according to the present invention will be described with reference to FIGS. 32 and 33B. FIG. 32 is a block diagram showing the configuration of the servo signal generation circuit according to the sixteenth embodiment, and FIG. 33B is a graph showing the relation of the level and the polarity of the tilt error signal with respect to the quantity and the direction of the radial tilt according to the sixteenth embodiment. The information reproduction apparatus of the sixteenth embodiment differs, in configuration, from that of the thirteenth embodiment only in the configuration of the servo signal generation circuit, and other configuration is the same as that of the thirteenth embodiment. Therefore, the same components are indicated by the same reference numerals and their description will be omitted.

In the fourteenth embodiment, the received light signal Spr corresponding to the first VFO data 120 in the header portion 11 is subtracted from the received light signal Spl corresponding to the first VFO data 120 in the header portion 10 to generate the subtraction signal Sg. The received light signal Spl and the received light signal Spr are added to each other to produce the addition signal Su, the subtraction signal Sg is multiplied by the addition signal Su to produce the multiplication signal Sk, and then the error signal generation circuit 12c extracts the D.C. component of multiplication signal Sk to generate the tilt error signal Ste. In contrast, in the sixteenth embodiment, the amplitude of the multiplication signal Sk is detected, and the error signal generation circuit 12c generates the tilt error signal Ste based on the change of the amplitude thus detected. Namely, as shown in FIG. 32, the servo signal generation circuit 32 according to the sixteenth embodiment includes the delay circuit 12a, subtracter 30a, the adder 30b, the multiplier 30c, and the error signal generation circuit 12c, which have the same functions as those in the fourteenth embodiment, and the amplitude detection circuit 32a. The amplitude detection circuit 32a detects the amplitude of the multiplication signal Sk (having completely the same waveform as in the case of fourteenth embodiment shown in FIG. 30A) corresponding to the radial tilt and outputted by the multiplier 30c, and supplies the detected amplitude to the error signal generation circuit 12c as the amplitude signal Sa. The error signal generation circuit 12c may be the averaging circuit or the low-pass filter like the case of the fourteenth embodiment, and extracts the D.C. component of the amplitude signal Sa to generate the tilt error signal Ste, and supplies it to the driver 13.

As shown in FIG. 33B, the relation of the level and the polarity of the tilt error signal Ste obtained by extracting the D.C. component of the respective amplitude signals Sa by means of the error signal generation circuit 12c with respect to the quantity and the direction of the radial tilt is substantially the linear function like the cases of the previous embodiments. Thus, by generating the drive signal Sd based on the tilt error signal Ste, the reliable drive signal Sd can be generated and the existing radial tilt can be accurately compensated for by driving the motor 5 using the drive signal Sd. As described above, according to the radial tilt compensation performed by the information reproduction apparatus of the sixteenth embodiment, since the amplitude of the multiplication signal Sk is detected to generate the tilt error signal Ste indicative of the radial tilt, the advantageous effect similar to that in the thirteenth embodiment can be achieved.

The above described embodiments are directed to the application of the present invention to the information reproduction apparatus for reproducing information from the DVD-RAM 1. However, the present invention is applicable to an information recording apparatus for recording information on the DVD-RAM 1. In such a case, for example, the address information recorded at each header area S0 to S7 are read out based on the reproduction signal Spu outputted by the reproduction circuit 110 shown in FIG. 4. Simultaneously, information to be recorded is encoded, and then the encoded information is recorded on the DVD-RAM 1 at the recording position determined by the address information. In this application to the information recording apparatus, the existing radial tilt may be accurately detected and compensated for, and hence information can be accurately recorded.

In the above embodiments, the first VFO data 120 in the header portion 10 and the first VFO data 120 in the header portion 11 are used to detect the radial tilt. Alternatively, the second VFO data 25 in the header portion 10 and the second VFO data 25 in the header portion 11 may be used to detect the radial tilt because completely the same periodical pit arrays are formed on those areas.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 10-309193 filed on Oct. 29, 1998 including the specification, claims, drawings and summary is incorporated herein by reference in its entirety.

What is claimed is:

1. A tilt detector adapted to be used for a storage medium provided with a recording track on which information is recorded and a first and a second header portions, each arranged in a manner shifted in opposite directions to each other from a center line of the recording track, said detector comprising:

a light irradiation unit for irradiating a light beam onto the first header portion, the second header portion and the recording track;

a light receiving unit having a first.light receiving surface and a second light receiving surface arranged adjacently to each other on both sides of a divisional line which is in parallel with the direction of the center line and for receiving the light beam reflected by the storage medium, the first light receiving surface outputting a first output and the second light receiving surface outputting a second output;

an operation unit for executing an arithmetic operation of the first output and the second output to generate an operation result signal; and an error signal generation unit for generating a tilt error signal based on the operation result signal, the tilt error signal compensating a tilt between the storage medium and an optical axis of the light beam.

2. The tilt detector according to claim 1, wherein the error signal generation unit comprises a low-pass filter which extracts a low-frequency component of the operation result signal as the tilt error signal.

3. The tilt detector according to claim 1, wherein the error signal generation unit comprises an averaging circuit which extracts a D.C. component of the operation result signal as the tilt error signal.

4. The tilt detector according to claim 1, wherein the storage medium comprises a disc-shaped storage medium, the recording track comprising a pre-groove portion and a land portion, the first header portion being arranged in a manner shifted by a half track pitch in a first radial direction of the disc-shaped recording medium from a center line of the pre-groove portion, and the second header portion being arranged in a manner shifted by the half track pitch in a second radial direction, opposite to the first radial direction, of the disc-shaped recording medium from the center line of the pre-groove portion.

5. The tilt detector of claim 1, further comprising a tilt compensating unit that includes a driver that operates in response to the tilt error signal, a motor controlled by said driver, and a screw that moves the light receiving unit to compensate the tilt and that is driven by the motor.

6. The tilt detector of claim 1, further comprising means for moving the light receiving unit to compensate the tilt in response to the tilt error signal.

7. A tilt compensating apparatus for a storage medium provided with a recording track on which information is recorded and a first and a second header portions, each arranged in a manner shifted in opposite directions to each other from a center line of the recording track, the tilt compensating apparatus comprising:

a light irradiation unit for irradiating a light beam onto the first header portion, the second header portion and the recording track;

a light receiving unit having a first light receiving surface and a second light receiving surface arranged adjacently to each other on both sides of a divisional line which is in parallel with the direction of the center line and for receiving the light beam reflected by the storage medium, the first light receiving surface outputting a first output and the second light receiving surface outputting a second output;

an operation unit for executing an arithmetic operation of the first output and the second output to generate an operation result signal;

an error signal generation unit for generating a tilt error signal based on the operation result signal; and a tilt compensating unit for compensating a tilt between the storage medium and an optical axis of the light beam, based on the tilt error signal.

8. The tilt detector of claim 7, wherein said tilt compensating unit comprises a driver that operates in response to the tilt error signal, a motor controlled by said driver, and a screw that moves the light receiving unit to compensate the tilt and that is driven by the motor.

9. The tilt detector of claim 7, wherein said tilt compensating unit comprises means for moving the light receiving unit to compensate the tilt in response to the tilt error signal.

10. A tilt compensating method for a storage medium provided with a recording track on which information is recorded and a first and a second header portions, each arranged in a manner shifted in opposite directions to each other from a center line of the recording track, the tilt compensating method comprising the steps of:

irradiating a light beam onto the first header portion, the second header portion and the recording track;

receiving the light beam reflected by the storage medium on a first light receiving surface and a second light receiving surface, the first light receiving surface outputting a first output and the second light receiving surface outputting a second output;

executing an arithmetic operation of the first output and the second output to generate an operation result signal;

generating a tilt error signal based on the operation result signal; and compensating a tilt between the storage medium and an optical axis of the light beam, based on the tilt error signal.

11. A tilt detector adapted to be used for a disc-shaped storage medium provided with a recording track on which information is recorded and header areas on which predetermined address information is recorded, the recording track comprising a pre-groove portion and a land portion, each of the header areas comprising a first header portion arranged in a manner shifted by a half track pitch in a first radial direction of the storage medium from a center line of the pre-groove portion and a second header portion arranged in a manner shifted by a half track pitch in a second radial direction, opposite to the first radial direction, of the storage medium from the center line of the pre-groove portion, the tilt detector comprising:

an irradiation unit for irradiating a light beam onto the header areas and the recording track;

a light receiving unit having a first light receiving surface and a second light receiving surface arranged adjacently to each other on both sides of a divisional line which is in parallel with the direction of the center line and for receiving the light beam reflected by the storage medium, the first light receiving surface outputting a first output and the second light receiving surface outputting a second output;

a reproduction signal generation unit for generating a first reproduction signal corresponding to the address information recorded in the first header portion and a second reproduction signal corresponding to the address information recorded in the second header portion based on the first output and the second output;

a delay unit for delaying the first reproduction signal by a predetermined time period to generate a delay signal;

an operation unit for executing an arithmetic operation of the delay signal and the second reproduction signal to generate an operation result signal; and an error signal generation unit for generating a tilt error signal based on the operation result signal, the tilt error signal indicating a tilt between the storage medium and an optical axis of the light beam.

12. The tilt detector according to claim 11, wherein the tilt error signal compensates the tilt.

* * * * *